US012706392B1

(12) United States Patent
Khushrushahi

(10) Patent No.: US 12,706,392 B1
(45) Date of Patent: Aug. 11, 2026

(54) METAMATERIAL SYSTEM ENDOWING OBJECT WITH ADJUSTABLE RADAR PROFILE (TRACK ONE)

(71) Applicant: Notch, Inc., Cambridge, MA (US)

(72) Inventor: Shahriar Khushrushahi, Cambridge, MA (US)

( * ) Notice: Subject to any disclaimer, the term of this patent is extended or adjusted under 35 U.S.C. 154(b) by 370 days.

(21) Appl. No.: 18/102,281

(22) Filed: Jan. 27, 2023

Related U.S. Application Data

(60) Provisional application No. 63/303,624, filed on Jan. 27, 2022, provisional application No. 63/303,650, filed on Jan. 27, 2022.

(51) Int. Cl.
*H01Q 17/00* (2006.01)

(52) U.S. Cl.
CPC .................................. *H01Q 17/007* (2013.01)

(58) Field of Classification Search
CPC ..................................................... H01Q 17/007
(Continued)

(56) References Cited

U.S. PATENT DOCUMENTS

| | | | |
|---|---|---|---|
| 6,538,621 | B1 | 3/2003 | Sievenpiper et al. |
| 8,339,320 | B2 | 12/2012 | Sievenpiper et al. |

(Continued)

FOREIGN PATENT DOCUMENTS

| | | | |
|---|---|---|---|
| IT | PI20080014 | A1 | 5/2008 |
| KR | 10-1567260 | B1 | 11/2015 |
| KR | 10-2002-0058483 | A | 5/2022 |

OTHER PUBLICATIONS

Costa et al., "Analysis and Design of Ultra Thin Electromagnetic Absorbers Comprising Resistively Loaded High Impedenace Surfaces", IEEE Transactions of Antennas and Propagation, vol. 58, No. 5, May 2010, pp. 1551-1558.

(Continued)

*Primary Examiner* — Samarina Makhdoom
(74) *Attorney, Agent, or Firm* — Merchant & Gould P.C.

(57) ABSTRACT

Vehicles with adjustable metamaterial systems, integrated on the outside or inside of their non-conductive fuselage, have the ability to control their radar cross section dynamically for the purposes of evading detection or spoofing their size by looking larger or more numerous. The frequency response of a metamaterial system can be obtained by combining the RF properties of the individual metamaterial layers that comprise it. A first metamaterial layer that can controllably switch between transmissive and reflection in a relevant frequency band and a second absorptive layer results in a controllable radar cross-section with the ability of controlling the amplitude of the reflected radar pulse. The first layer can be modulated with a repetitive waveform to change the phase of a reflected wave that results in a doppler shift in frequency. The frequency of the modulation can result in a change in range, velocity, or combinations of both. The waveform used can also create a linear change of phase or can be made pseudorandom to create decoy targets that appear to move with random ranges and velocities as detected by a radar. The metamaterial layers can also have a separate passband for allowable communications, navigations, or for other wireless uses within the vehicle. The passband itself can also be switchable or tunable to allow for multiple passband frequencies.

20 Claims, 27 Drawing Sheets
(17 of 27 Drawing Sheet(s) Filed in Color)

(58) Field of Classification Search
USPC ........................................................ 342/1
See application file for complete search history.

(56) References Cited

U.S. PATENT DOCUMENTS

| | | | | |
|---|---|---|---|---|
| 8,633,866 | B2 | 1/2014 | Sarabandi et al. | |
| 9,105,978 | B2 | 8/2015 | Bowers et al. | |
| 10,355,356 | B2 | 7/2019 | Casse et al. | |
| 10,727,823 | B2 | 7/2020 | Liu et al. | |
| 2011/0187577 | A1* | 8/2011 | Fuller | H01Q 15/0086 342/22 |
| 2012/0018653 | A1* | 1/2012 | Bowers | H01Q 15/0066 250/505.1 |
| 2015/0260812 | A1* | 9/2015 | Drake | G01R 33/34092 324/322 |
| 2016/0011307 | A1* | 1/2016 | Casse | H01Q 15/0086 701/93 |
| 2017/0141477 | A1* | 5/2017 | Kim | H01Q 15/0066 |
| 2018/0351250 | A1* | 12/2018 | Achour | H01Q 21/064 |
| 2019/0081618 | A1* | 3/2019 | Liu | H01Q 15/14 |
| 2019/0131721 | A1* | 5/2019 | Dani | H01Q 21/24 |
| 2022/0085337 | A1 | 3/2022 | Cai | |
| 2022/0225494 | A1 | 7/2022 | Han et al. | |

OTHER PUBLICATIONS

Costa et al., "A Frequency Selective Radome with Wideband Absorbing Properties", IEEE Transactions on Antennas and Propagation, vol. 60, No. 6, Jun. 2012, pp. 2740-2747.

Zadeh et al., "Capacitive Circuit Method for Fast and Efficient Design of Wideband Radar Absorbers", IEEE Transactions on Antennas and Propagation, vol. 57, No. 8, Aug. 2009, pp. 2307-2314.

Kazemzadeh, "Nonmagnetic Ultrawideband Absorber with Optimal Thickness", IEEE Transactions on Antennas and Propagation, vol. 59, No. 1, Jan. 2011, pp. 135-140.

Li et al., "Nonlinear, active, and tunable metasurfaces for advanced electromagnetics applications," IEEE Access, vol. 5 (2017) pp. 27439-27452.

Luo et al., "Electrically tunable metasurface absorber based on dissipating behavior of embedded varactors" Applied Physics Letters vol. 109, (2016) 5 pages.

Pfeiffer et al., "Cascaded metasurfaces for complete phase and polarization control." Applied Physics Letters, vol. 102 (2013). pp 1-5.

Wakatsuchi et al., "Waveform-dependent absorbing metasurfaces," University of California, Applied Electromagnetics Group, San Diego, CA, Mar. 20, 2018, pp. 1-9.

Han et al., "Low Spurious, Broadband Reflection Frequency Modulation Using an Active Metasurface." IEEE Microwave and Wireless Components Letters, vol. 32, No. 4, Apr. 2022, pp. 359-362.

Ramaccia et al. "Phase-induced frequency conversion and Doppler effect with time-modulated metasurfaces." IEEE Transactions on Antennas and Propagation, vol. 68, No. 3 (2019), pp. 1-9.

Zhu, et al., "Active impedance metasurface with full 360 reflection phase tuning." Scientific reports, vol. 3, No. 1, Oct. 11, 2013, pp. 1-6.

* cited by examiner

METAMATERIAL SYSTEM ENDOWING OBJECT WITH ADJUSTABLE RADAR PROFILE (TRACK ONE)

RELATED APPLICATIONS

The present application claims the benefit of provisional application Ser. No. 63/303,624, filed Jan. 27, 2022, entitled “Adjustably Transmissive, Reflective, and Absorptive Fabric-Based Metamaterial Systems”, and provisional application Ser. No. 63/303,650 filed Jan. 27, 2022, entitled “Controllable Stealth Metamaterial Systems”. Each of these applications is incorporated herein by reference in its entirety.

TECHNICAL FIELD

The present invention relates to metamaterials and, more particularly, their use in providing an adjustable radar profile of a vehicle that has a controllable metamaterial system integrated as part of its exterior surfaces.

BACKGROUND ART

As is known in this art, metamaterials are materials engineered to have properties not found in natural materials. They are constructed using arrays of periodic conductive structures that are sub-wavelength of the phenomena they influence and derive their properties from these structures. Metamaterials can be designed to manipulate the phase, magnitude, and polarization of impinged, reflected, and transmitted Radio Frequency (RF) waves or to create frequency selective behavior and absorptive behavior. The literature teaches wide band absorptive metamaterials to reduce RCS as a passive absorber and metamaterials configured as High-Impedance Surfaces to modify the doppler shift of a reflected wave.

U.S. Pat. No. 8,633,866 B2 discloses metasurfaces as sub-wavelength frequency-selective surface structures.

U.S. Pat. No. 8,339,320 B2 discloses tunable frequency selective surfaces.

Italian Pat. No. 20080014 Aq discloses electromagnetic absorbers made with high impedance active surfaces.

Academic paper: Costa, Filippo, et al. “Analysis and Design of Ultra Thin Electromagnetic Absorbers Comprising Resistively Loaded High Impedance Surfaces.” IEEE Transactions on Antennas and Propagation, vol. 58, no. 5, May 2010, pp. 1551-58. IEEE Xplore, https://doi.org/10.1109/TAP.2010.2044329.

Academic paper: Costa, Filippo, and Agostino Monorchio. “A Frequency Selective Radome With Wideband Absorbing Properties.” IEEE Transactions on Antennas and Propagation, vol. 60, no. 6, June 2012, pp. 2740-47. IEEE Xplore, https://doi.org/10.1109/TAP.2012.2194640.

Academic paper: Kazem Zadeh, Alireza, and Anders Karlsson. “Capacitive Circuit Method for Fast and Efficient Design of Wideband Radar Absorbers.” IEEE Transactions on Antennas and Propagation, vol. 57, no. 8, August 2009, pp. 2307-14. IEEE Xplore, https://doi.org/10.1109/TAP.2009.2024490.

Academic paper: Kazemzadeh, Alireza. “Nonmagnetic Ultrawideband Absorber With Optimal Thickness.” IEEE Transactions on Antennas and Propagation, vol. 59, no. 1, January 2011, pp. 135-40. IEEE Xplore, https://doi.org/10.1109/TAP.2010.2090481.

U.S. Pat. No. 6,538,621 B1 discloses tunable high impedance surfaces and the control of reflection phase.

U.S. Pat. No. 9,105,978 B2 discloses control of reflected phase from a metamaterial through controlling reflective metamaterials at different depths to generate an effective velocity and doppler shift.

U.S. Pat. No. 10,355,356 B2 discloses control of reflected phase with the use of an active high impedance surface.

U.S. Pat. No. 10,727,823 B2 discloses the control of reflected phase with the use of varactor diodes on a high impedance surface.

U.S. Pat. No. 2022/0225494 A1 discloses a passive metamaterial electromagnetic absorber made of two layers.

World Patent No. 2022/085337 A1 discloses a two-layer passive metamaterial absorber.

Korean Patent No. 10-1567260, B1 discloses a multilayer passive metamaterial absorber with a ground plane.

Korean Patent No. 10-2022-0058483 discloses a multilayer passive metamaterial absorber with a ground plane.

U.S. Patent No. 2017/0141477 discloses a frequency conversion device that creates a phase change and a doppler shift of a reflected wave off a metamaterial surface configured as a high impedance surface. The high impedance surface is modulated with a waveform to create the phase change.

Academic paper: Li, Aobo, et al. “Nonlinear, active, and tunable metasurfaces for advanced electromagnetics applications.” IEEE Access 5 (2017): 27439-27452. Discusses the use of high impedance surfaces with diodes for use as absorbers.

Academic paper: Luo, Zhangjie, et al. “Electrically tunable metasurface absorber based on dissipating behavior of embedded varactors.” Applied Physics Letters 109.7 (2016): 071107. Discusses the design of high impedance surfaces configured as absorbers and using varactors.

Academic paper: Pfeiffer, Carl, and Anthony Grbic. “Cascaded metasurfaces for complete phase and polarization control.” Applied Physics Letters 102.23 (2013): 231116. Discusses the use of cascaded passive metasurfaces to create a cumulative metamaterial response and in this case it is phase and polarization control.

Academic paper: Wakatsuchi, Hiroki, et al. “Waveform-dependent absorbing metasurfaces.” Physical review letters 111.24 (2013): 245501. Discusses the use of different waveforms to control a metasurfaces absorption.

Academic paper: Han, Heeje, et al. “Low Spurious, Broadband Reflection Frequency Modulation Using an Active Metasurface.” IEEE Microwave and Wireless Components Letters 32.4 (2021): 359-362. Discusses the use of varactor diodes and a modulation waveform to generate a phase variation of a reflected wave from a high-impedance surface.

Academic paper: Ramaccia, Davide, et al. “Phase-induced frequency conversion and Doppler effect with time-modulated metasurfaces.” IEEE Transactions on Antennas and Propagation 68.3 (2019): 1607-1617. Discusses the use of time modulated high impedance surfaces to modulate phase and create a change in doppler frequency of the return wave.

Academic paper: Zhu, Bo O., Junming Zhao, and Yijun Feng. “Active impedance metasurface with full 360 reflection phase tuning.” Scientific reports 3.1 (2013): 1-6. Discusses the use of a varactor based metasurface with a ground plane used to create 360 degree phase change of a reflected wave.

SUMMARY OF THE EMBODIMENTS

In one embodiment, the invention provides a metamaterial system for integration into an object to cause adjustment of a radar profile of the object. In this embodiment, the system includes a set of metamaterial structures including a first metamaterial structure configured to be controllably reflective and operating in a reflective mode at an external radar frequency f1 so as to cause reflection of an RF radar wave that is at frequency f1; a waveform generator coupled to a member of the set of metamaterial structures and configured to cause modification of the radar profile of the object by operating in a mode selected from the group consisting of: (a) generating a repetitive waveform at a set of frequencies for providing an apparent change only in a range of the object; (b) generating a repetitive waveform at a set of frequencies for providing an apparent change in both range and velocity of the object; (c) generating a repetitive waveform at a set of frequencies for providing an apparent change only in a velocity of the object; (d) generating a pseudorandom binary sequence waveform at a set of frequencies for providing a set of radar decoys having a set of different ranges and velocities as compared to those of the object; and (e) combinations of the foregoing.

Optionally, the waveform generator is configured to operate in a mode selected from the group consisting of: (b) generating a repetitive waveform at a set of frequencies for providing an apparent change in both range and velocity of the object; (c) generating a repetitive waveform at a set of frequencies for providing an apparent change only in a velocity of the object; (d) generating a pseudorandom binary sequence waveform at a set of frequencies for providing a set of radar decoys having a set of different ranges and velocities as compared to those of the object; and (e) combinations of the foregoing.

Optionally, the waveform generator is configured to operate in a mode selected from the group consisting of: (a) generating a repetitive waveform at a set of frequencies for providing an apparent change only in a range of the object; (c) generating a repetitive waveform at a set of frequencies for providing an apparent change only in a velocity of the object; (d) generating a pseudorandom binary sequence waveform at a set of frequencies for providing a set of radar decoys having a set of different ranges and velocities as compared to those of the object; and (e) combinations of the foregoing.

Optionally, the waveform generator coupled to a member of the set of metamaterial structures and configured to cause modification of the radar profile of the object by operating in a mode selected from the group consisting of: (a) generating a repetitive waveform at a set of frequencies for providing an apparent change only in a range of the object; (c) generating a repetitive waveform at a set of frequencies for providing an apparent change in both range and velocity of the object; (d) generating a pseudorandom binary sequence waveform at a set of frequencies for providing a set of radar decoys having a set of different ranges and velocities as compared to those of the object; and (e) combinations of the foregoing.

Optionally, the waveform generator coupled to a member of the set of metamaterial structures and configured to cause modification of the radar profile of the object by operating in a mode selected from the group consisting of: (a) generating a repetitive waveform at a set of frequencies for providing an apparent change only in a range of the object; (b) generating a repetitive waveform at a set of frequencies for providing an apparent change in both range and velocity of the object; (c) generating a repetitive waveform at a set of frequencies for providing an apparent change only in a velocity of the object; and (d) combinations of the foregoing.

As a further option, In another embodiment, the invention provides a metamaterial system for integration into an object to cause adjustment of a radar profile of the object. In this embodiment, the system includes a set of metamaterial structures including a first metamaterial structure configured to be controllably reflective; and a second metamaterial structure configured to be absorptive at an external radar frequency f1; wherein the first metamaterial structure overlies the second metamaterial structure; a control signal generator coupled to the first metamaterial structure and configured to cause the first metamaterial structure to operate in the transparent mode, the control signal generator further configured to control an extent of transmissivity of the first metamaterial structure, at the external radar frequency f1, in combination with absorption by the second metamaterial structure, so as to endow the object with a customized radar cross-section that is potentially larger, or smaller, than that of the object without the metamaterial system, or to render the object invisible to radar.

Optionally, wherein the first and second metamaterial structures are configured to be transmissive at a frequency different from f1 to support communications through both the first and the second metamaterial structures while still functioning as a radar reflector at frequency f1.

As a further option, where the first and second metamaterial structures are electronically configured to be transmissive at a plurality of non-radar frequencies, allowing for multiple communication channels.

As a further option, wherein any given one of the plurality of transmissive frequencies is user selectable, providing flexibility in communication and radar operation.

As a further option, wherein any given one of the plurality of transmissive frequencies is tunable, allowing for precise adjustment of the communication and radar operation.

In another embodiment, the metamaterial systems are incorporated in a vehicle.

In another embodiment, the waveform generator is further configured to modulate the reflected RF wave as a means of encoding information in digital communications.

In another embodiment, the waveform generator is further configured to operate in a mode selected from the group consisting of: (c) generating a repetitive waveform at a set of frequencies for providing an apparent change only in a velocity of the object; (d) generating a pseudorandom binary sequence waveform at a set of frequencies for providing a set of radar decoys having a set of different ranges and velocities as compared to those of the object; and (e) combinations of the foregoing.

In another embodiment, the waveform generator is configured to operate in a mode elected from the group consisting of: (a) generating a repetitive waveform at a set of frequencies for providing an apparent change only in a range of the object; (d) generating a pseudorandom binary sequence waveform at a set of frequencies for providing a set of radar decoys having a set of different ranges and velocities as compared to those of the object; and (e) combinations of the foregoing.

In yet another embodiment, the waveform generator is configured to operate in a mode selected from the group consisting of: (a) generating a repetitive waveform at a set of frequencies for providing an apparent change only in a range of the object; (b) generating a repetitive waveform at a set of frequencies for providing an apparent change in both range and velocity of the object; and (e) combinations of the foregoing.

In another embodiment, the waveform generator is configured to operate in a mode selected from the group consisting of: (a) generating a repetitive waveform at a set of frequencies for providing an apparent change only in a range of the object; (c) generating a repetitive waveform at a set of frequencies for providing an apparent change only in a velocity of the object; and (e) combinations of the foregoing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing features of embodiments will be more readily understood by reference to the following detailed description, taken with reference to the accompanying drawings, in which.

DETAILED DESCRIPTION OF SPECIFIC EMBODIMENTS

Figure 1:
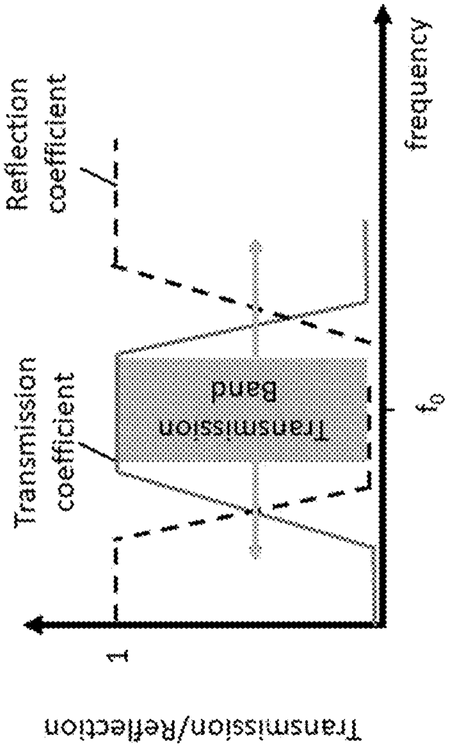
FIG. 1 is a transmission/reflection plot as a function of frequency of a band-pass metamaterial centered at a frequency $f_0$ in accordance with an embodiment of the present invention.

Definitions. As used in this description and the accompanying claims, the following terms shall have the meanings indicated, unless the context otherwise requires:

A "set" includes at least one member.

"Electrical control" or "electronic control" of a metamaterial is control, achieved using applied voltage and/or current, of a property of the metamaterial or any component thereof, the addition of a PIN diode, a PN diode, a varactor diode, a light-emitting diode, a transistor, a FET switch, a MEM switch or other non-linear or linear switching element, and combinations thereof including series and parallel circuit combinations.

A "metamaterial" is an engineered material in a member selected from the group consisting of a surface, a volume, and combinations thereof, by virtue of a set of cells organized in a repeated pattern in the material. Metamaterials can be designed to have frequency selective behavior tuned at a resonant frequency, to exhibit filter characteristics such as band-pass, band-reject, high pass, low pass, and combinations thereof. They can be designed to affect the phase, magnitude, bandwidth, and polarization of impinged, reflected, and transmitted electromagnetic waves. These properties of the metamaterial, including the tuned resonant frequency, can be modified by mechanical control, magnetic control, electrical control or electronic control and combinations thereof; these forms of control may be active or passive. Optionally, the set of cells of the metamaterial organized in a repeated pattern is infinitely dense so as to constitute a ground plane.

A "normally transmissive" metamaterial is one configured by a set of conductive loops or other means to become transmissive of RF energy over a relevant frequency band.

A "normally transmissive" metamaterial is one made reflective when RF energy, over a relevant frequency band, otherwise transmissive by the metamaterial is not enabled to pass through and is reflected by the material.

A "normally reflective" metamaterial is one configured by a set of conductive loops or other means to become reflective of RF energy over a relevant frequency band.

A "normally reflective" metamaterial is one made transmissive when RF energy, over a relevant frequency band, otherwise reflective by the metamaterial is enabled to pass through and is transmitted by the material.

A metamaterial is "transmissive" if it is configured to transmit at least some of the RF energy incident thereon, even though some of the RF energy is absorbed.

A metamaterial is "reflective" if it is configured to reflect at least some of the RF energy incident thereon, even though some of the RF energy is absorbed.

To "control a property of the metamaterial" is to control a parameter associated with the metamaterial in connection with a wave impinging, reflected, or transmitted thereon, the parameter selected from the group consisting of transmissivity, control the extent of transmissivity, reflectivity, control the extent of reflectivity, absorption, control the extent of absorption, phase of transmitted wave, angle of reflection, polarization, bandwidth, resonant frequency, angle of refraction, and combinations thereof.

To "control the extent of transmissivity" means to modify the amplitude of the electromagnetic wave transmitted through the metamaterial, by changing the percentage of transmissivity between the range of 0% to 100% including 0% and 100%.

To "control the extent of reflection" means to modify the amplitude of the electromagnetic wave reflected by the metamaterial, by changing the percentage of reflectivity between the range of 0% to 100% including 0% and 100%.

To "control the extent of absorption" means to modify the absorption of the electromagnetic wave impinged on the metamaterial, by changing the percentage of absorption between the range of 0% to 100% including 0% and 100%.

A metamaterial structure is "configured to be absorptive" if it absorbs RF at a relevant frequency band.

A "vehicle" is a member selected from the group consisting of an aircraft, a motor vehicle, a water vessel, and a water vehicle.

To "absorb" electromagnetic wave means to either convert the electromagnetic energy into heat using resistive elements or reflecting the electromagnetic wave to destructively interfere with the impinged energy, for the purposes of reducing reflection off the metamaterial surface and reducing transmission through the surface.

A "substrate" can include fabric, glass, FR4 or circuit board substrates, fiberglass, and other materials, woven or non-woven, on which the metamaterial's conductive pattern can be embedded or suspended.

A "conductive layer" is a layer comprised of any material that creates an electrically conductive layer on the substrate. This includes the application of conductive inks, conductive fibers, affixed conductive metals or solids, etched copper traces, and combinations thereof.

A metamaterial is "controllably reflective" in a designed frequency band if in the designed frequency band, it can be electronically configured to operate in a first mode wherein it is reflective and in a second mode wherein it is transmissive.

A "conductive plane" is a layer that is fully comprised of any material that creates is electrically conductive on the substrate that includes the application of conductive inks, conductive fibers, 3D printed conductive materials, affixed conductive metals or solids, etched copper traces, and combinations thereof.

An "active element" includes semiconductor devices such as FET switches, transistors, PN diodes, PIN diodes, varactor diodes, light-emitting diodes used independently or in combination with other active elements in series or parallel circuit combinations. The diodes can be configured to operate in reverse and or forward bias. Other lumped elements can also be connected to the electronically controllable active element such as resistors, capacitors, and inductors as is needed.

"Frequency band" is a continuous uninterrupted frequency range, for which a metamaterial is tuned, spanning from a minimum frequency to a maximum frequency.

"Resonant frequency band" is a frequency band or multiband for which the metamaterial is tuned.

"Bandwidth" of a metamaterial is the range of a frequency band, for which the metamaterial is tuned, and is the difference between the maximum and minimum frequency in the frequency band.

A "center frequency" of a metamaterial is a single frequency that is in the center of the resonant frequency band for which the metamaterial is tuned.

"Multi-band" of a metamaterial is a set of frequency bands centered at different center frequencies with different bandwidths.

A "passive" control is control achieved without the continuous application of power, although power may be applied initially in changing a geometric feature or other configuration.

An "active" control is control achieved through the sustained application of power over time.

A "filter" is a metamaterial that can have filter characteristics that can be band-pass, band-reject, all pass, or all-reject. An all-pass filter can be without any conductive regions. An all-reject filter can be a conductive layer equivalent to a fully conductive plane.

"Mechanical control" of a metamaterial is control, achieved using any mechanically based technology, of a property of the metamaterial by causing a physical change in a dimension, location, or orientation of any component of the metamaterial. "Mechanical control" includes control achieved by a magnetic, electric, or electromagnetic force to effectuate such a change, including by use of a shape-memory alloy, a tunable material, or a mechanical actuator.

To "selectively address" a set of cells means to control separately at least one property of each of the metamaterial cells in the set.

A "via" is a conductor connecting at least one conductive segment in one layer to another conductive segment in another layer.

A "functional conductive structure" is a part of a metamaterial cell, wherein the part is disposed in a plane and includes conductive structures and active elements.

The present invention relates to metamaterials and their construction to create an adjustable radar profile of a vehicle that has a controllable metamaterial system integrated as part of its exterior surfaces. A metamaterial system that can controllably adjust its reflection and absorption in a relevant frequency band can dynamically change the Radar Cross Section (RCS) of a vehicle. The metamaterial system can also have a passband to allow necessary communications and navigation frequencies to pass through to wireless equipment inside the vehicle. The passband can also be tuned or switched to multiple frequencies of interest for control. For instance, Unmanned Aerial Vehicles, frequently use 2.4 GHz and 5.8 GHz frequencies and a passband that can dynamically switch between them is possible. The metamaterial system achieves this combination of RF configurations by having metamaterial layers placed above one another with the first metamaterial layer controlling the ability to be fully reflective (to increase RCS) or fully transmissive. In the fully reflective configuration, this metamaterial layer can be modulated with a repetitive waveform from an arbitrary waveform generator to change the phase of a reflected wave, creating a doppler shift and a higher frequency return signal on the receiving radar system. This change in phase, can result in single or multiple decoys varying in range and velocity detected by radar. The waveform can also be pseudorandom to create decoy targets that have random ranges and velocities changing in time by the receiving radar. In the transmissive configuration, the radio wave passes through to the absorber metamaterial layer where it is absorbed. Passbands can be integrated as part of the metamaterial layers allowing radio wave energy of that frequency to freely pass through the metamaterial system for communication purposes.

In accordance with embodiments of the present invention, methods and apparatus are disclosed for constructing a metamaterial system integrated on the exterior of a vehicle or other object and can adjust its radar profile electronically. Radar systems give information on the velocity and range of the vehicle by processing the reflected radar pulse to determine the time delay and doppler shift between the received and the incident radar pulse. In addition, the magnitude of the reflected radar pulse also known as the radar cross-section or radar signature, is a measure of the reflectivity of the vehicle/object. This reflectivity depends on the size and material of the vehicle's exterior surfaces, the polarization, incident and reflected angles of the incident and reflected radar pulses, pulse repetition frequency, and radar carrier frequency and waveform. The radar cross-section of a vehicle can be used to identify the vehicle and hence the ability to adjust this radar profile is a highly desirable capability to remain undetected or to create decoys.

Metamaterials are engineered materials that can be controlled to be adjustably transmissive, reflective, and absorptive to RF energy. The metamaterials are constructed by creating periodic electrically conductive patterns on different layers of dielectric substrate and combining these layers to give specific transmission, reflectivity, or absorption in a frequency band. The substrates can be chosen to be rigid or flexible to create any conformal shape as is desired. The conductive layers can be constructed on various substrates through various processes that are reductive or additive in nature. A reductive process includes etching copper into patterns on a printed circuit board (PCB) substrate such as FR-4. An additive process includes printing conductive inks on a substrate, such as printing conductive inks in specific patterns on substrates. The method of adjusting the RF response of the metamaterial can be done by mechanical control or by using electrical control to control a property of the metamaterial.

The frequency response of a metamaterial system can be obtained by combining the RF properties of the individual metamaterial layers that comprise it. These metamaterial layers can include a band-pass metamaterial, a band-reject metamaterial, and an absorber metamaterial. These metamaterials layers and their combinations can be constructed into individually addressable sections that can be integrated into the exterior of a vehicle. This can be in the form of metamaterial "tiles" that cover the exterior surface or can be integrated inside an exterior surface of the vehicle if the exterior surface is made of an RF transparent material.

Figure 2:
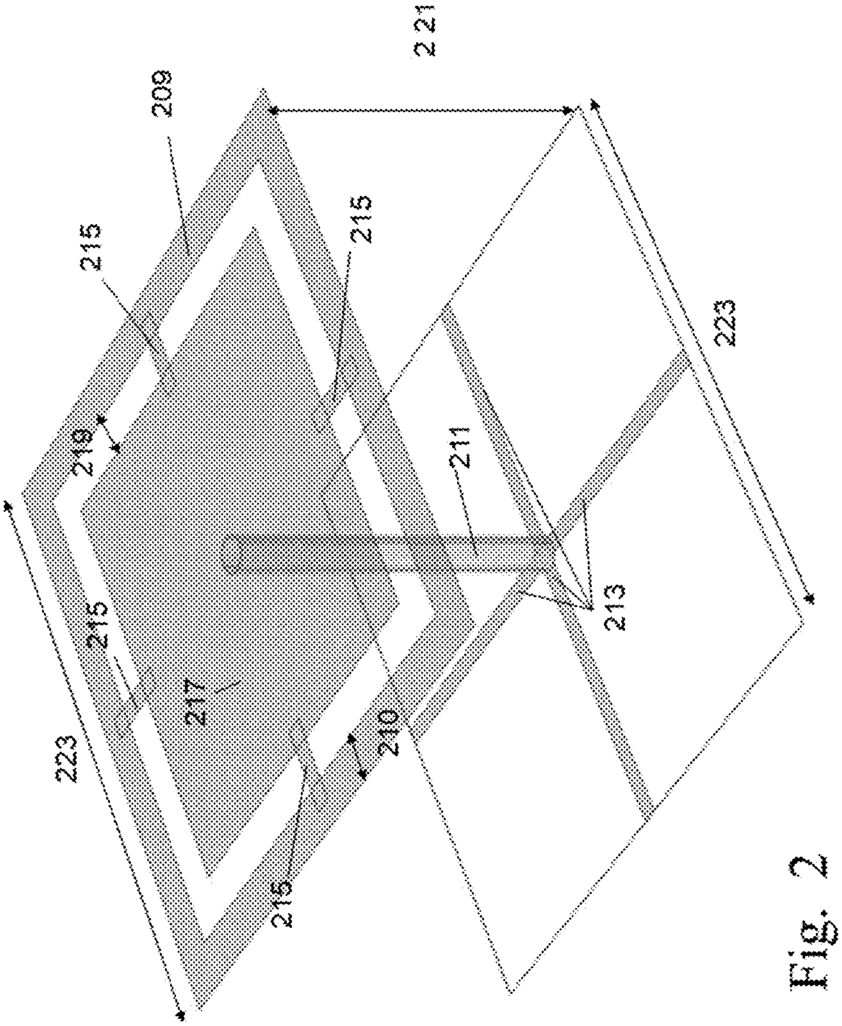
FIG. 2 is a perspective rendering of the band-pass active metamaterial having a square element structure with electronic components with dimensions that control a property of the active band-pass metamaterial in accordance with an embodiment of the present invention.
Figure 3:
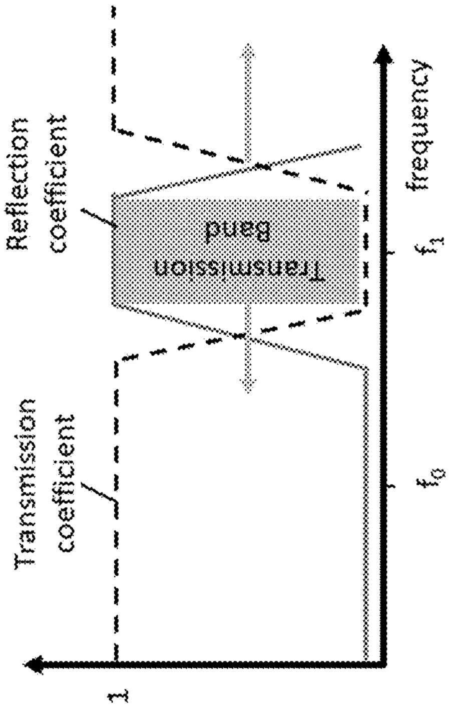
FIG. 3 is a transmission/reflection plot as a function of frequency of an active band-pass metamaterial tuned to a new center frequency $f_1$ from $f_0$ in accordance with an embodiment of the present invention.

In accordance with an embodiment of the present invention, one building block is the use of a band-pass metamaterial with a passband centered at a frequency $f_0$ as shown in FIG. 1. Any suitable frequency selective surface structure can be used to create this band-pass metamaterial. FIG. 2 is a perspective rendering of such a frequency selective structure with a periodic cell having a square element structure with electronic components configured to form an active band-pass metamaterial unit with dimensions that control a property of the active band-pass metamaterial in accordance with an embodiment of the present invention. The shaded regions 209, 217, 213 and 211 identify conductive media. Parameters of the unit such as width of outer square loop, 210, width of the non-conductive gap, 219, the spatial periodicity of the unit cell, 223, the height of the substrate, 221, separating the bottom grid and top periodic structure etc. determine the filter characteristics (such as resonant frequency, bandwidth etc.) of the unit. The distance between the layers and between the elements can be controlled to change the frequency response. Below the element aperture layer including conductive regions 209, 217, and 211 is another grid layer 213. The two layers are connected by a via or metal post 211. To affect characteristics of the metamaterial, electronic components such as PIN, PN, transistors (BJT, MOSFET etc.), lumped inductors and capacitors and varactor diodes, or combinations of these elements connected alone, in series, in parallel or combinations of series and parallel, are placed across the non-conductive gap 215 such that these elements are effectively connected in a parallel circuit with an applied voltage on a single top layer 209 and the bottom layer grid layer 213 grounded. The PN, PIN, varactor diodes can be arranged to be forward, reverse biased or a combination distributed around the ring or through other bottom grid layers and top layers. The varactor diode has diode capacitance that can change as a function of reverse bias voltage. This change in capacitance can be used to change the resonant frequency of a metamaterial that the varactor is integrated on. PIN, PN diodes and FETs also experience a change in capacitance between on and off states that can be used to change the resonant frequency of a metamaterial. Using these devices, the passband of a band-pass metamaterial can be fixed or adjusted to switch or tune to another frequency $f_1$ in accordance with an embodiment of the present invention as illustrated in FIG. 3. By tuning the pass-band metamaterial away from the center frequency of the passband where it is maximally transmissive, will result in reducing the transmissivity to 0%. This enables the ability to control the extent of transmissivity of a pass-band metamaterial and is also a method to control the extent of reflectivity. Additionally, the diodes can be selected with higher breakdown voltages or series combinations of diodes can be used to increase the power handling capability of the metamaterial.

Figure 4:
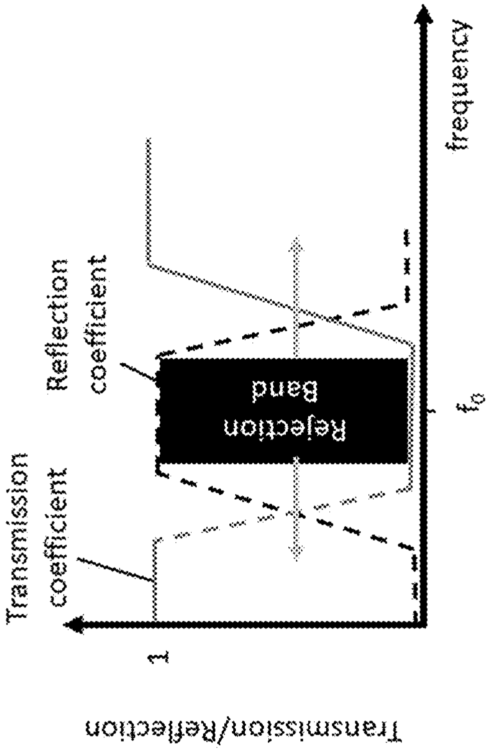
FIG. 4 is a transmission/reflection plot as a function of frequency of a band-reject metamaterial with a reject band centered at a frequency $f_0$ in accordance with an embodiment of the present invention.
Figure 5:
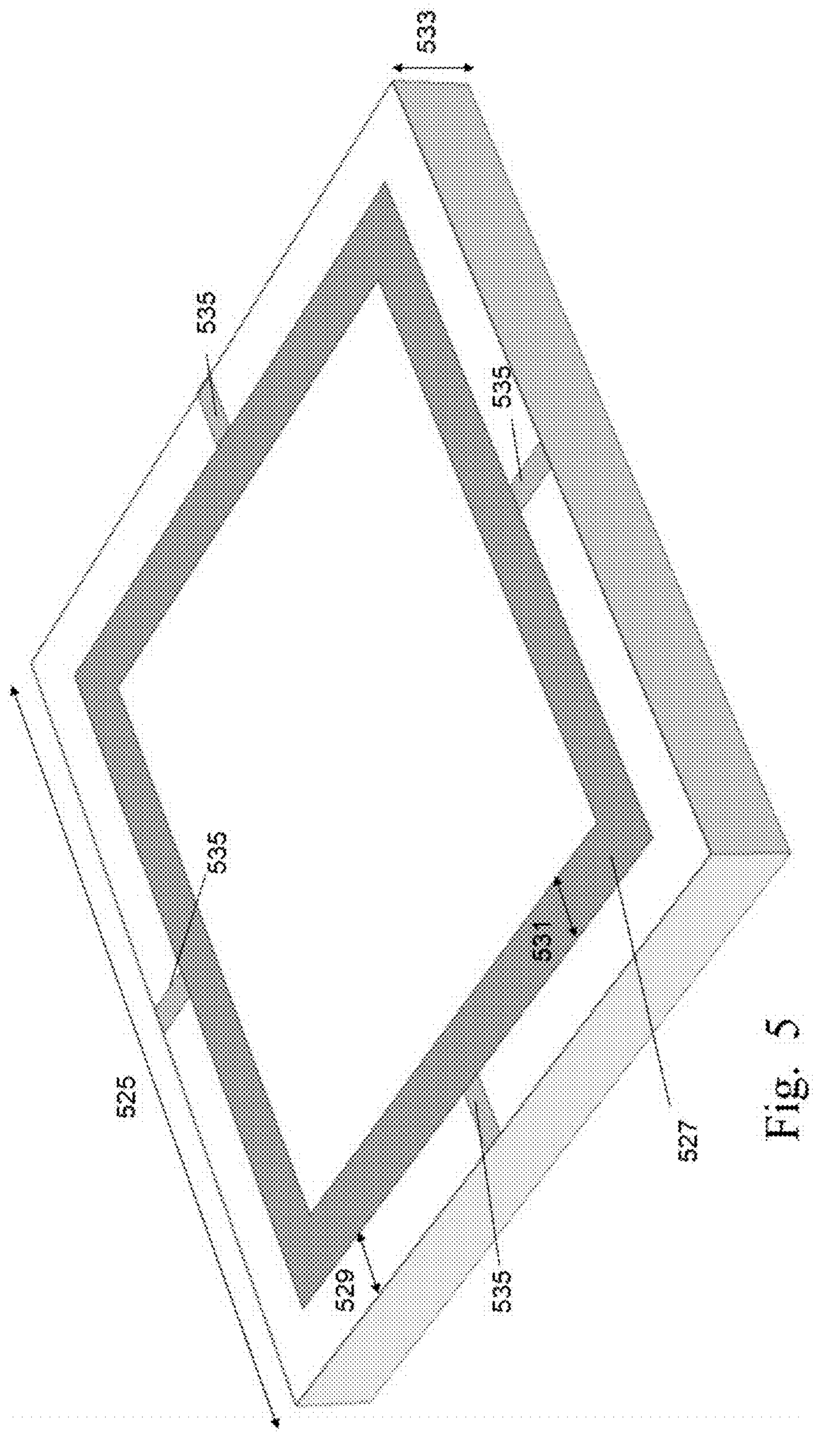
FIG. 5 is a perspective rendering of a cell having a square element periodic structure with electronic components but configured to form an active band-reject metamaterial unit with dimensions that control a property of the active band-reject metamaterial in accordance with an embodiment of the present invention.

In accordance with an embodiment of the present invention, another building block is the use of a band-reject metamaterial with a reject band centered at a frequency $f_0$ as shown in FIG. 4. Similar to the band-pass metamaterial case any suitable frequency selective surfaces structure can be used to create this band-reject metamaterial. In accordance with an embodiment of the present invention, FIG. 5 is perspective rendering of a cell having a square element periodic structure with electronic components, similar to that of FIG. 2, but configured to form an active band-reject metamaterial unit with dimensions that control a property of the active band-reject metamaterial in accordance with an embodiment of the present invention. In a manner analogous to the embodiment of FIG. 2, the resonant frequency of maximum reflectance is determined by parameters including the periodicity, 525, of a unit cell, the width 531 of the conductive loop, the separation distance 529 between the conducive loop and the outer boundary of the unit, and the substrate thickness 533. Similarly, as in the case of FIG. 2, to affect characteristics of the metamaterial, electronic components such as PIN, PN, transistors (BJT, MOSFET etc.), lumped inductors and capacitors and varactor diodes, or combinations of these elements connected alone, in series, in parallel or combinations of series and parallel, are placed across the gap 529, such that these elements are effectively connected in series on the single top layer. The combinations, type and number of elements placed across these allow for a multitude of behaviors. The varactor diode has diode capacitance that can change as a function of reverse bias voltage. This change in capacitance can be used to change the resonant frequency of a metamaterial that the varactor is integrated on. PIN, PN diodes and FETs also experience a change in capacitance between on and off states that can be used to change the resonant frequency of a metamaterial. Using these devices, the reject band can be adjusted to switch or tune to another frequency as shown in FIG. 4. By tuning the band-reject metamaterial away from the center frequency of the reject band where it is maximally reflective, will result in reducing the reflectivity to 0%. This enables the ability to control the extent of reflectivity of a band-reject metamaterial or as a method to also control the extent of transmissivity.

Figure 6:
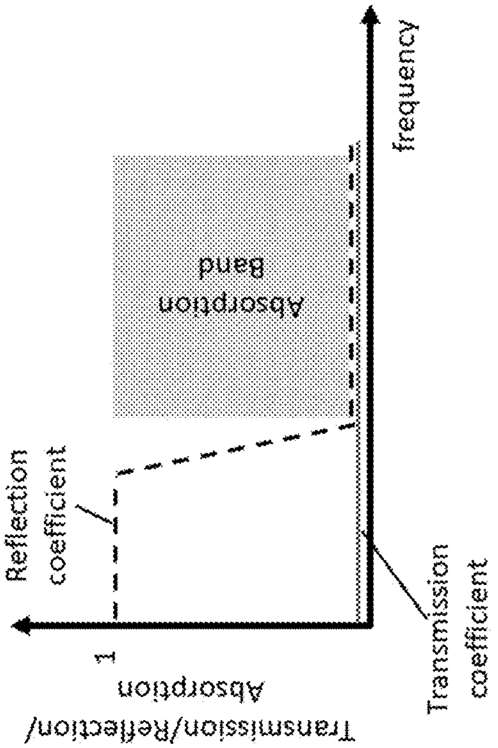
FIG. 6 is a transmission/reflection/absorption plot as a function of frequency of an absorptive metamaterial configured to be fully reflective over a first frequency band and absorptive over a second frequency band in accordance with an embodiment of the present invention.
Figure 7:
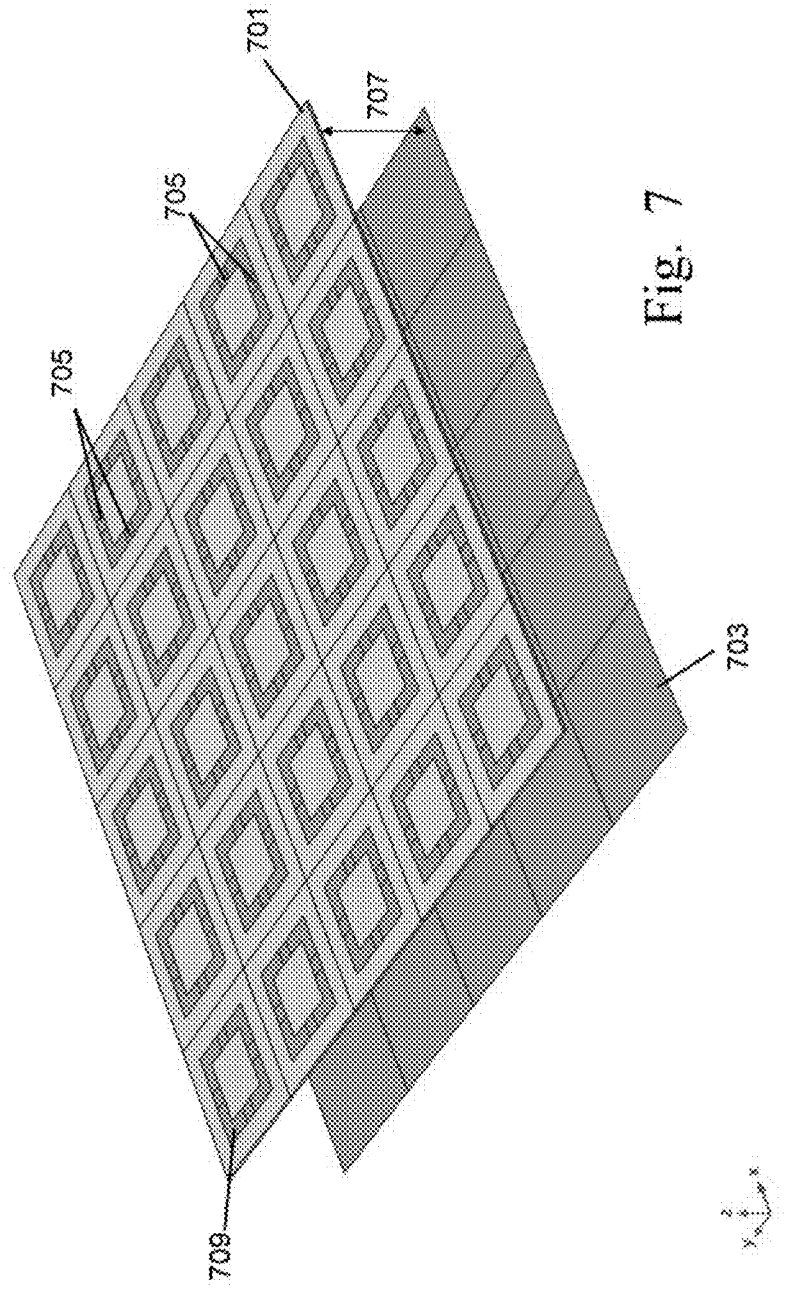
FIG. 7 illustrates the construction of a metamaterial absorber, configured to be fully reflective over a first frequency band and absorptive over a second frequency band in accordance with an embodiment of the present invention.
Figure 8:
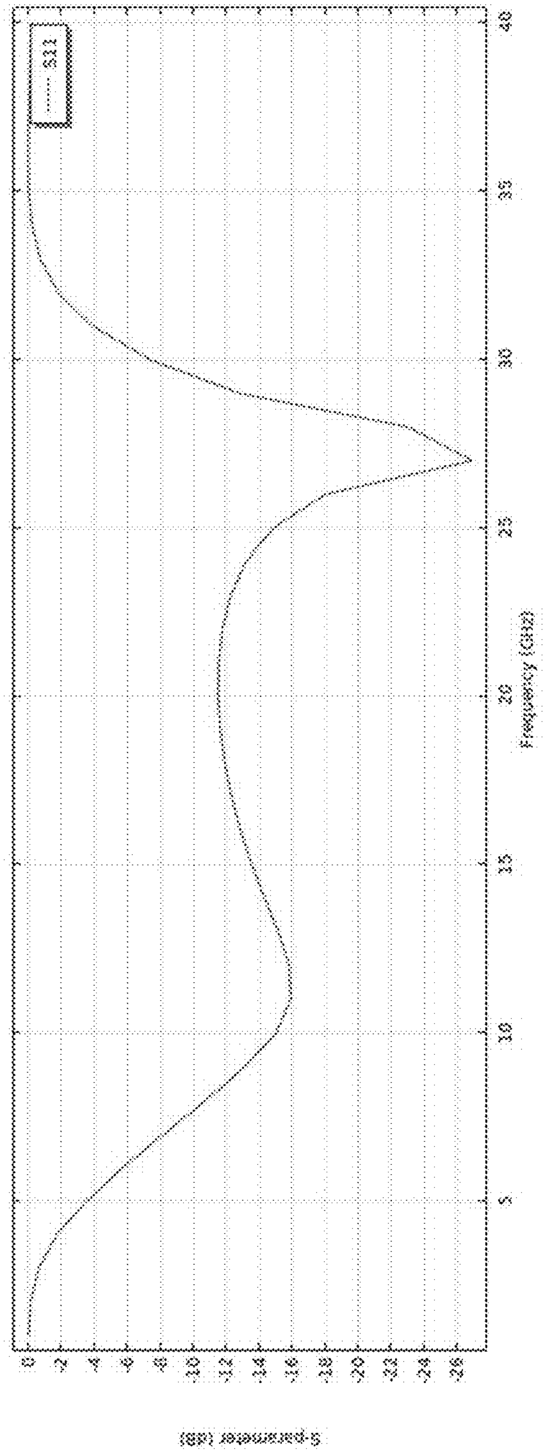
FIG. 8 illustrates the absorption characteristics of a wide-band metamaterial absorber constructed with the use of lumped resistors on copper traces etched from an FR4 substrate in accordance with an embodiment of the present invention.

In accordance with an embodiment of the present invention, another building block is the use of an absorptive metamaterial layer with an absorptive frequency band as illustrated in FIG. 6. Any suitable absorptive frequency selective structure can be used for the absorptive layer. This includes a band-pass or band-reject layer on the layer facing the impinged RF energy with a second fully conductive layer to ensure that there is no transmission of RF energy through the material. FIG. 7 illustrates the construction of a metamaterial absorber, configured to be fully reflective over a first frequency band and absorptive over a second frequency band in accordance with an embodiment of the present invention. FIG. 7 is constructed of a top band-reject layer 701, similar to FIG. 5, with the conductive traces 709 and lumped resistors 705 electrically connected. Alternatively, a resistive conductive trace can be used instead deposited using direct write of conductive inks of a specified resistivity, 3D printed conductive materials, or by other means. The two layers are separated by a height 707. This separation distance must be maintained to maintain the frequency response of absorption by using a filler RF transparent layer of by other means. The second fully conductive layer, 703, underlies the first layer and prevents the RF energy from transmitting through. This layer can be a fully conductive plane where its S11 is as close to 0 dB across the entire frequency spectrum. FIG. 8 illustrates the absorption characteristics of a wideband metamaterial absorber constructed with the use of lumped resistors on copper traces etched from an FR4 substrate in accordance with an embodiment of the present invention. The top band-reject layer of FIG. 7 can, in addition to resistive elements, integrate electronic control as described in the section associated with FIG. 5. PN, PIN, FETs or varactor diodes can be used to tune the absorption band, and this would enable control of the extent of absorption.

Figure 9:
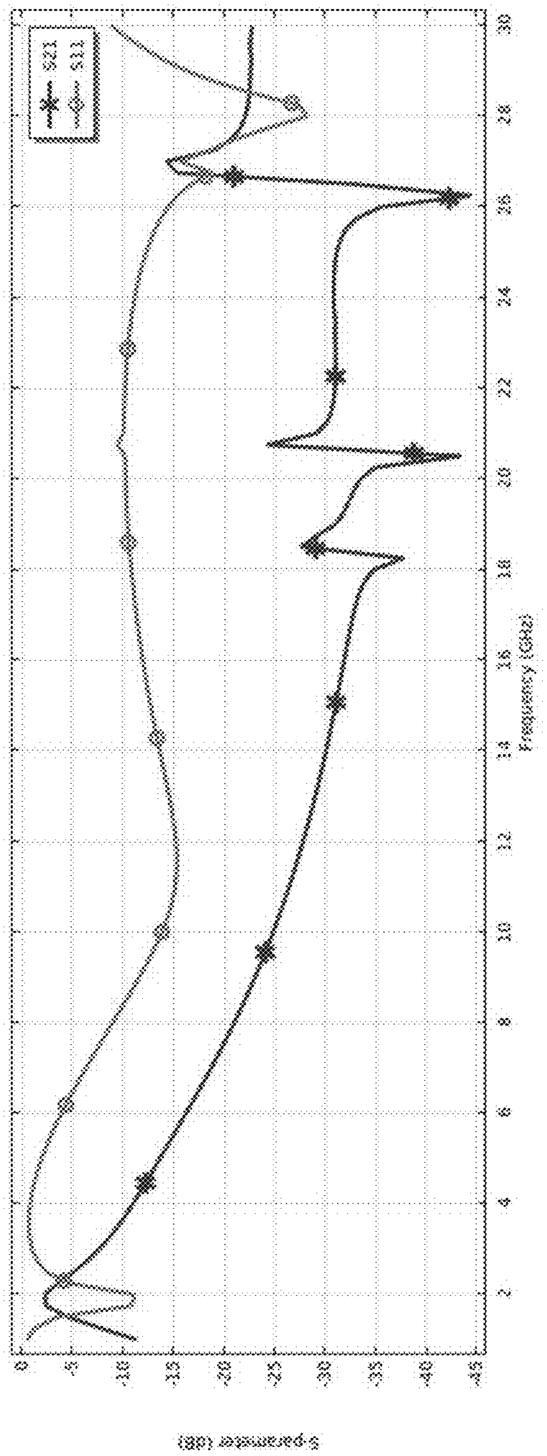
FIG. 9 illustrates the absorption characteristics with a passband at 2 GHz constructed by using a band-pass metamaterial instead of the complete ground plane in accordance with an embodiment of the present invention.
Figure 10:
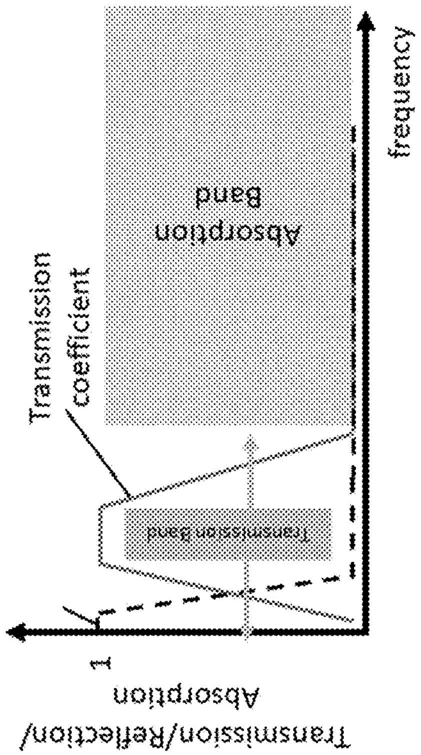
FIG. 10 is a transmission/reflection/absorption plot as a function of frequency of an absorptive metamaterial with a band-reject configuration on the top layer and a band-pass metamaterial on the bottom layer using diodes that allow for tuning of the transmission band in accordance with an embodiment of the present invention.

A metamaterial layer of FIG. 1 with a passband and a large reject band can be substituted for the ground plane 703 in FIG. 7. This creates a passband response for the absorber in the frequency band where the metamaterial has an S11 that is not maximally as close to 0 dB. FIG. 9 illustrates the absorption characteristics with a passband at 2 GHz constructed by using a band-pass metamaterial instead of the complete ground plane in accordance with an embodiment of the present invention. Additionally, in accordance with an embodiment of the present invention, the metamaterial structure that comprises the ground plane 703 can be made to be dynamically tuned/switched as needed as shown in FIG. 10 using electronic control with the use of PIN, PN, FETs, or varactor diodes. The varactor diode has diode capacitance that can change as a function of reverse bias voltage. This change in capacitance can be used to change the resonant frequency of a metamaterial that the varactor is integrated on. PIN, PN diodes and FETs also experience a change in capacitance between on and off states that can be used to change the resonant frequency of the metamaterial layer. Additionally, electronic control using these diodes and FETs enable the tuning or switching of the passband into the absorption band and in effect controlling the extent of absorption in that band.

Figure 11:
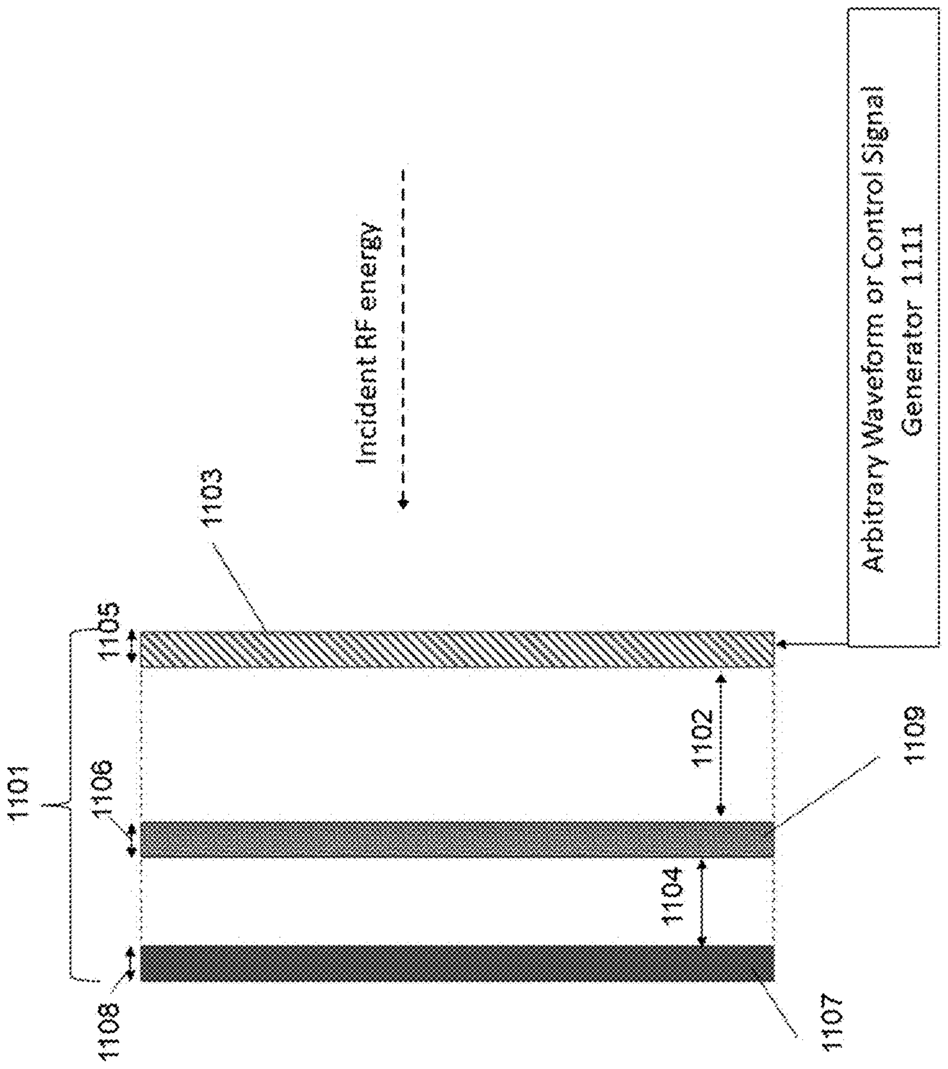
FIG. 11 is a cross-section diagram of a metamaterial system constructed to have properties of an electronically controllable absorber by overlaying a band-pass metamaterial on an absorber layer in accordance with an embodiment of the present invention.

FIG. 11 is a cross-section diagram of a metamaterial system constructed to have properties of an electronically controllable absorber by overlaying a band-pass metamaterial on an absorber layer in accordance with an embodiment of the present invention. The metamaterial system, 1101, is constructed from an electronically controllable band-pass metamaterial, 1103, of thickness 1105, separated by a distance 1102 from a metamaterial absorber comprising of a band-reject layer, 1109, and a ground plane, similar to the construction of the metamaterial absorber in FIG. 7. The distance 1102 can be an air gap or can be made of a RF transparent foam of the same distance, or it can be a dielectric. Additionally, the metamaterial system achieves the same capabilities by replacing the controllable band-pass metamaterial, 1103, with a controllable band-reject metamaterial by adjusting its resonant frequency. Alternatively, the ground plane 1107 can be a band-pass metamaterial itself as described in the previous paragraph to allow distinct frequencies to pass through the absorber. This is illustrated in FIG. 9 and in later sections discussing FIG. 18 and FIG. 19. The two layers 1109 and 1107, can have a thickness of 1106 and 1108, and are themselves separated by a distance 1104. Metamaterial layer 1103 can be controlled with an arbitrary waveform or control signal generator 1111 and this functionality is described in several other embodiments in this invention.

Figure 12:
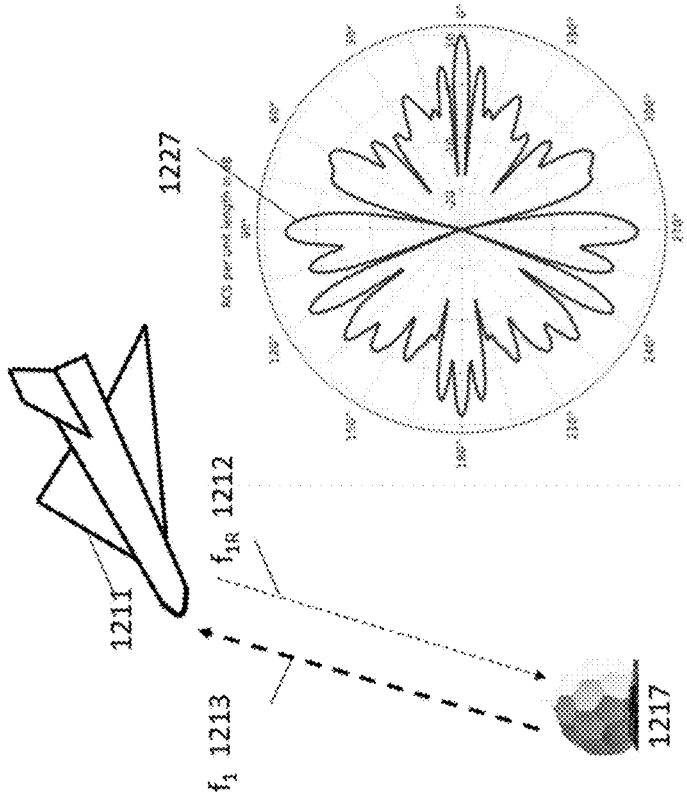
Fig. 12 Prior Art
FIG. 12 is a diagram of an aircraft, with no controllable metamaterial system installed, detected by a radar system, and having a distinct radar cross-section in accordance with the prior art.

FIG. 12 is a diagram of an aircraft, with no controllable metamaterial system installed, detected by a radar system, and having a distinct radar cross-section in accordance with the prior art. The radar system 1217 sends a radar pulse $f_1$, 1213, that gets reflected off the aircraft 1211. The reflected pulse $f_{1R}$ 1212 at different incident and reflected angles, can be used to construct the radar cross-section, 1227, and the radar cross-section can be used to identify the aircraft.

Figure 13:
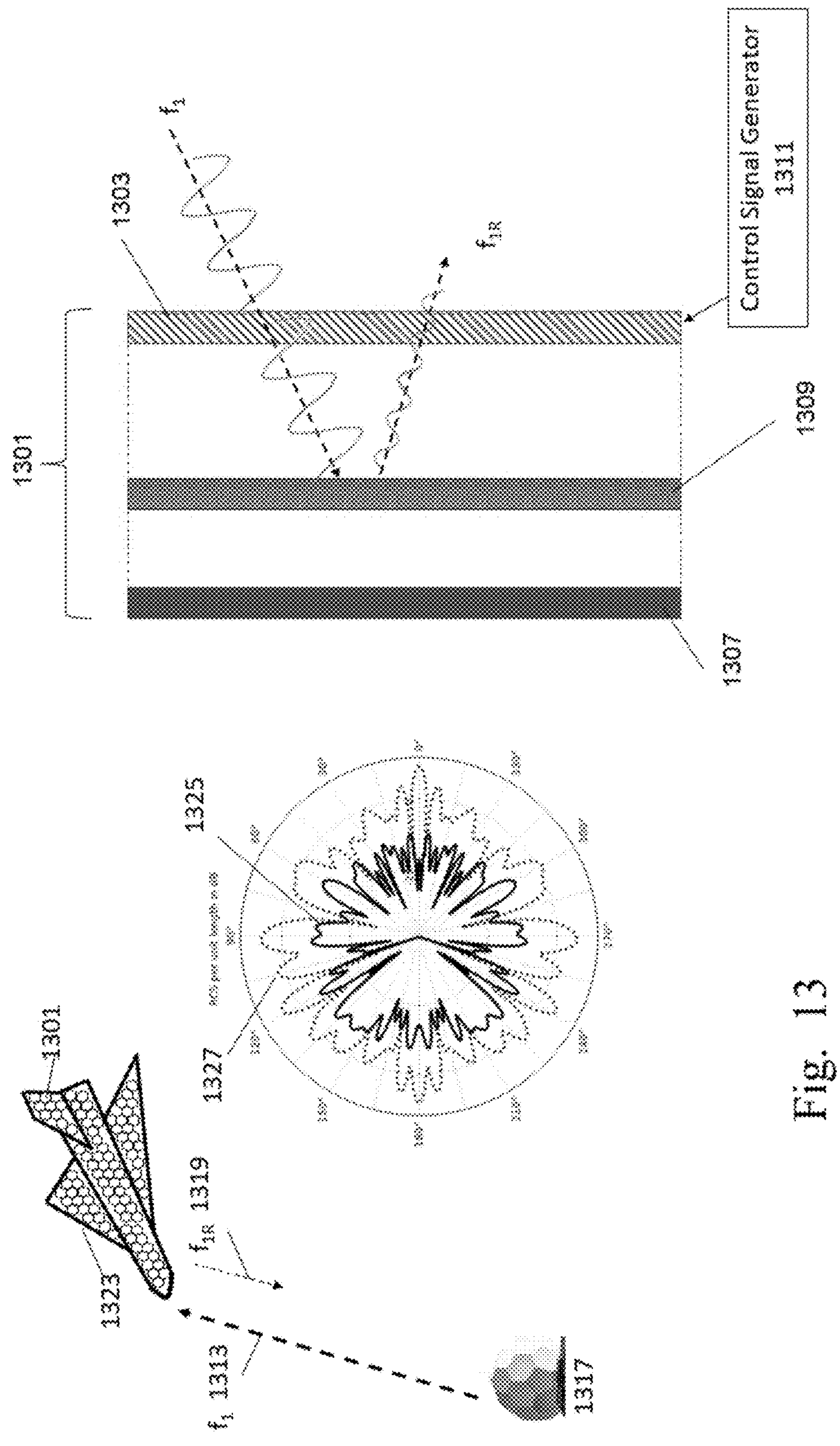
FIG. 13 is a diagram of an aircraft from FIG. 12 with a controllable metamaterial system of FIG. 11 installed and configured to be absorptive, resulting in a reduced radar cross-section that can be undetectable by the radar system in accordance with an embodiment of the present invention.

FIG. 13 is a diagram of an aircraft from FIG. 12 with a controllable metamaterial system of FIG. 11 installed and configured to be absorptive, resulting in a reduced radar cross-section that can be undetectable by the radar system in accordance with an embodiment of the present invention. The radar system, 1317, sends a radar pulse $f_1$, 1313, and the reflected radar wave $f_{1R}$, 1319, has a significant reduction in its energy through absorption by the metamaterial infused aircraft fuselage. The fuselage of the aircraft, 1323, has individually addressable and controllable metamaterial sections from FIG. 11, 1301, that look like pentagonal tiles in the diagram. These tiles are integrated either on its surface or inside it, assuming that the fuselage material is made of an RF transparent material. All the controllable metamaterial tiles, 1301, are configured to be in the absorptive mode. This is done by actuating the band pass metamaterial, 1303, using the control signal generator, 1311, to become transmissive to the incident radar frequency $f_1$ and allowing the incident RF energy to pass through to the absorptive layer 1309. The radar energy is absorbed by the absorptive metamaterial 1309 and 1307 and the reflected pulse is greatly attenuated. By actuating all the individual metamaterial tiles, 1301, to be absorptive, the radar cross-section of the aircraft is reduced to a minimum as shown by the solid polar plot line 1325 when compared with its original radar cross-section 1327 without a controllable metamaterial system. The radar cross-section of the aircraft without a controllable metamaterial system given by the dashed polar plot line 1327 and is equivalent to the radar cross-section, 1227, in FIG. 12.

Figure 14:
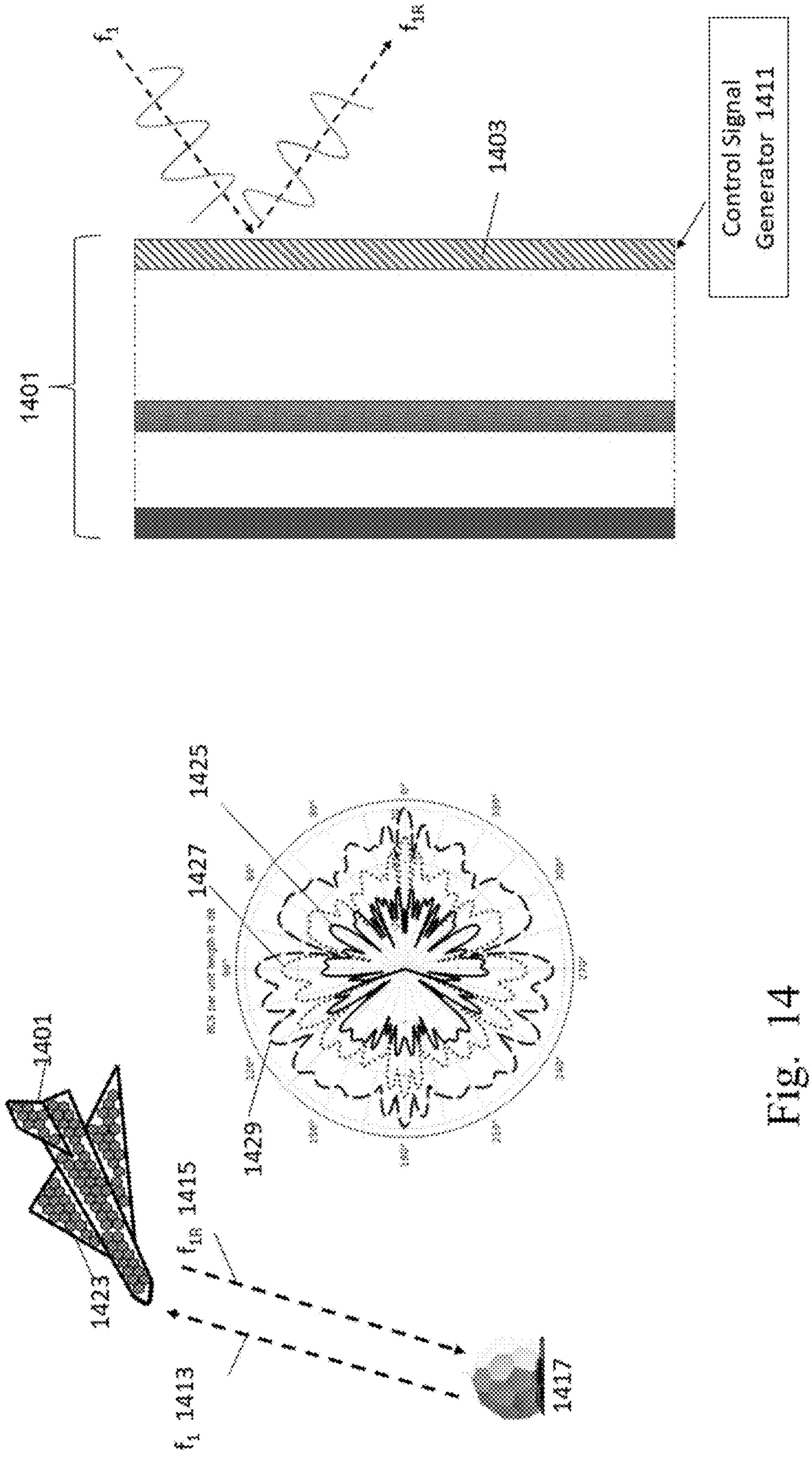
FIG. 14 is a diagram of an aircraft from FIG. 12 with a controllable metamaterial system of FIG. 11 installed and configured to be maximally reflective, resulting in a radar cross-section that is greater than the aircraft's radar-cross section without metamaterial system, with the purposes of ensuring detection by the radar or to create decoys in accordance with an embodiment of the present invention.

In accordance with an embodiment of the present invention, FIG. 14 is a diagram of an aircraft from FIG. 12 with a controllable metamaterial system of FIG. 11 installed and configured to be maximally reflective, resulting in a radar cross-section that is greater than the aircraft's radar-cross section without metamaterial system, with the purposes of ensuring detection by the radar or to create decoys. The radar system 1417 sends a radar pulse $f_1$, 1413, that is reflected off the fuselage of the aircraft, 1423, with the individually addressable metamaterial sections are all configured to be maximally reflective. The band-pass metamaterial system of FIG. 11, 1403, is configured to be 100% reflective to incident RF energy. This results in a reflected pulse $f_{1R}$, 1415, that has a greater amplitude than the reflected pulse, 1212, from FIG. 12. By activating all the metamaterial tiles that are integrated in the fuselage of 1423 to be reflective, the radar cross-section of the aircraft would be greater than that of FIG. 12. This larger radar cross-section is plotted as the solid dashed polar plot line 1429 with the original non-metamaterial system plotted as the dotted line 1427 and the controllable metamaterial system configured as an absorber plotted as 1425. This can be used to ensure detection by the radar system of a low observable or stealth aircraft. This metamaterial system can be used to create the larger radar cross-section of another aircraft or of decoys consisting of the radar cross-section of multiple aircraft.

Figure 15:
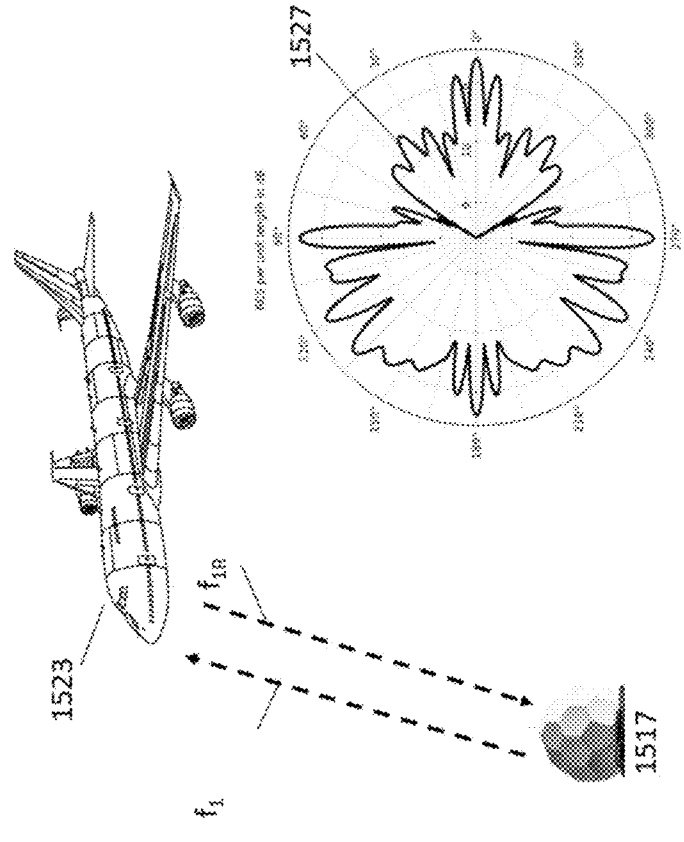
Fig. 15 Prior Art
FIG. 15 is a diagram of a 747 aircraft, 1523, with a plot of its radar cross-section 1527 as measured by the radar system, 1517 in accordance with the prior art.

FIG. 15 is a diagram of a 747 aircraft, 1523, with a plot of its radar cross-section 1527 as measured by the radar system, 1517 in accordance with the prior art.

Figure 16:
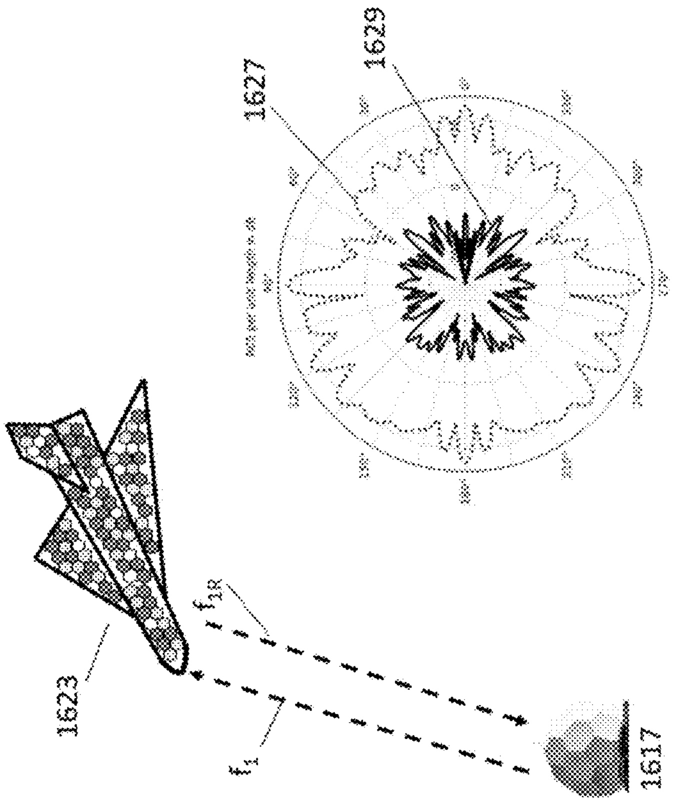
FIG. 16 is a diagram of an aircraft from FIG. 12 with a controllable metamaterial system of FIG. 11 installed and configured to have a radar cross-section, 1527, that is equivalent to that of the 747 aircraft from FIG. 15 in accordance with an embodiment of the present invention.

FIG. 16 is a diagram of an aircraft from FIG. 12 with a controllable metamaterial system of FIG. 11 installed and configured to have a radar cross-section, 1527, that is equivalent to that of the 747 aircraft from FIG. 15 in accordance with an embodiment of the present invention. The aircraft, 1623, can change its radar cross-section from a minimal radar cross-section to radar, shown by the solid polar plot line 1629 as described in FIG. 13, to having a radar cross-section identical to the 747 from FIG. 15 as shown by the dotted polar plot 1627. The aircraft of FIG. 16 can have a preprogrammed set of radar cross-sections to configure itself into, in response to some sensor onboard measuring the presence of a threat.

Figure 17:
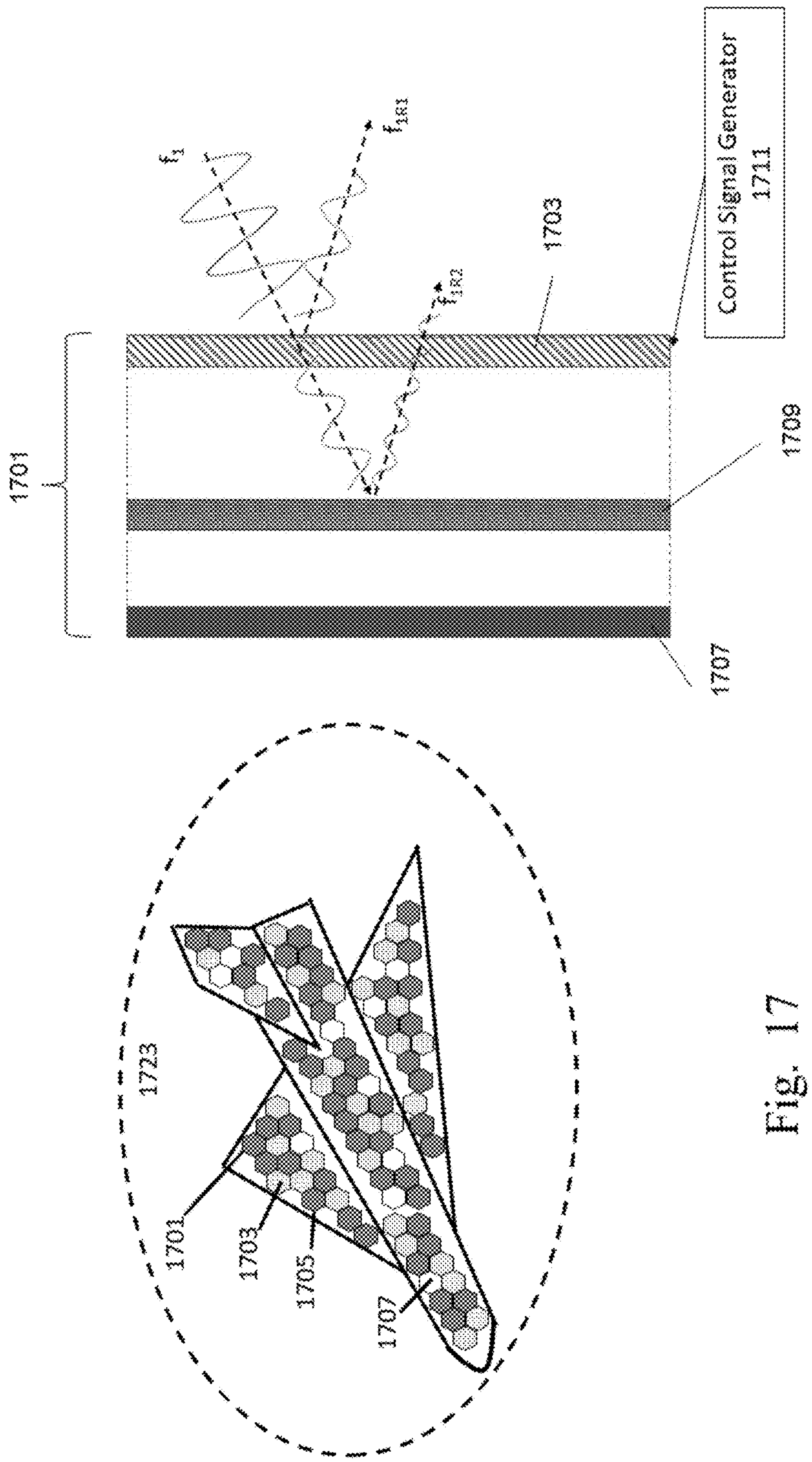
FIG. 17 is a diagram of the aircraft, 1623, from FIG. 16 illustrating the fuselage infused metamaterial tiles made from the controllable metamaterial system of FIG. 11 and their individual transmissivity/reflectivity/absorption configurations in accordance with an embodiment of the present invention.

In accordance with an embodiment of the present invention, FIG. 17 is a diagram of the aircraft, 1623, from FIG. 16 illustrating the fuselage infused metamaterial tiles made from the controllable metamaterial system of FIG. 11 and their individual transmissivity/reflectivity/absorption configurations. The individual electronically addressable and controllable metamaterial sections or tiles, 1701, can be configured to be fully transparent, 1707, or fully reflective, 1705, or partially reflective, 1703. Each metamaterial tile constructed as in FIG. 11, 1701, is configured with the control signal generator 1711, to control the extent of transmissivity through the band-pass metamaterial layer 1703 as described in the section describing the band-pass metamaterial of FIG. 1. This results in partial absorption by the absorption layer 1709 and 1707 and a reduced reflectivity due to the return radar pulses $f_{1R1}$ and $f_{1R2}$. The cumulative effect of these tiles configured in this manner is to generate a radar cross-section that is identical to that of another aircraft to function as a decoy.

Figure 18:
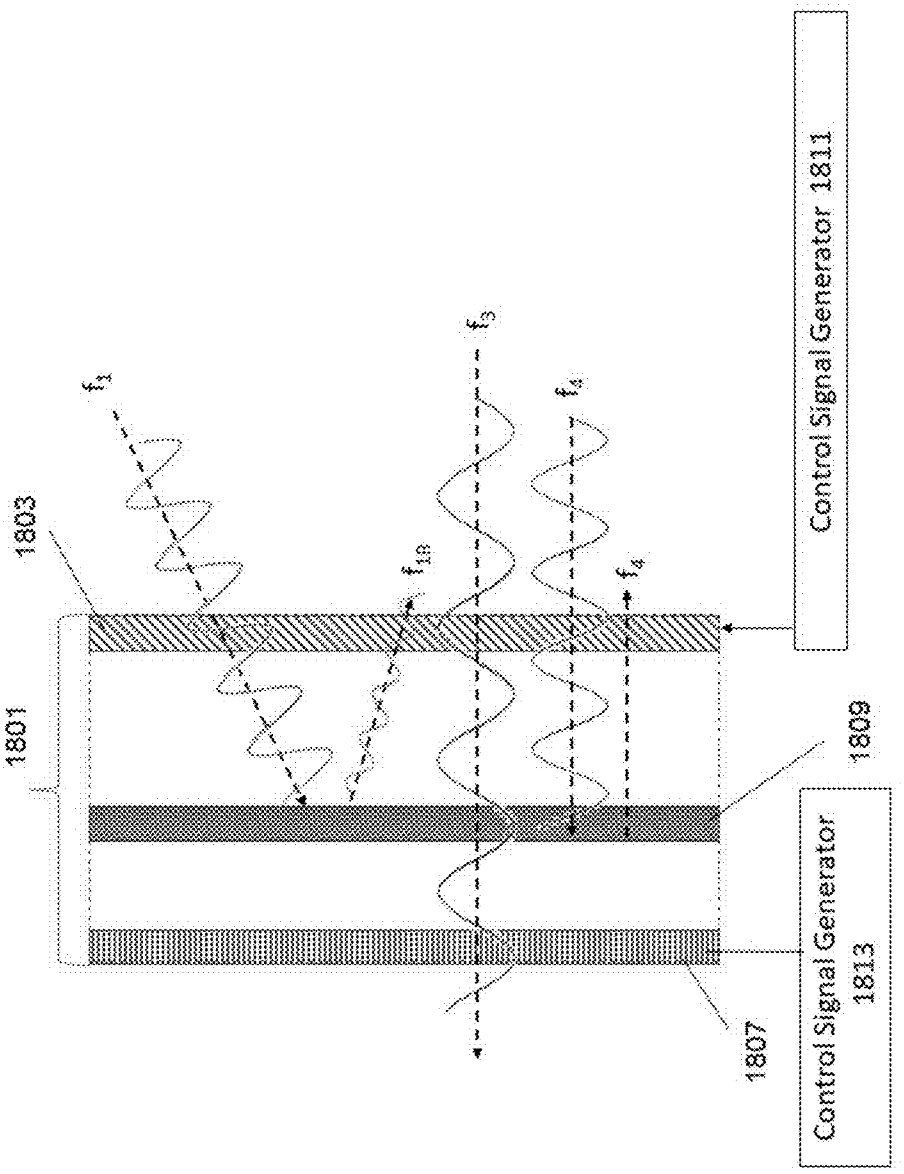
FIG. 18 is a diagram of the metamaterial system of FIG. 11 configured to have all the metamaterial layers configured to be transmissive to external frequency $f_3$ and frequency $f_4$ is transparent to the band-pass layer but reflected and not absorbed from the absorber metamaterial layers in accordance with an embodiment of the present invention.

In accordance with an embodiment of the present invention, FIG. 18 is a diagram of the metamaterial system of FIG. 11 configured to have all the metamaterial layers configured to be transmissive to external frequency $f_3$ and frequency $f_4$ is transparent to layer 1803 but reflected and not absorbed from the absorber metamaterial layers 1809 and 1807. In this embodiment, all the metamaterial layers 1803, 1809, and 1807 are all transparent to frequency $f_3$. The band-pass metamaterial of 1803 must be designed with a fixed passband that is transparent to $f_3$ and $f_4$ while using a control signal generator 1811 to control the extent of transmissivity of 1803 for frequency $f_1$. The metamaterial absorber comprising of 1809 and 1807 have to be designed to also have a pass band at $f_3$, while being absorptive at $f_1$ and being reflective at frequency $f_4$. The construction of this absorber metamaterial was described in the section describing FIG. 7 and the creation of a passband shown in the scattering parameter plot of FIG. 9. The absorber layers of 1809 and 1807 can be designed to be controllably transparent to frequency $f_3$ and $f_4$. In one configuration as shown in this figure, the absorber layers absorb frequency $f_1$ and are reflective to $f_4$ but transparent to $f_3$.

Figure 19:
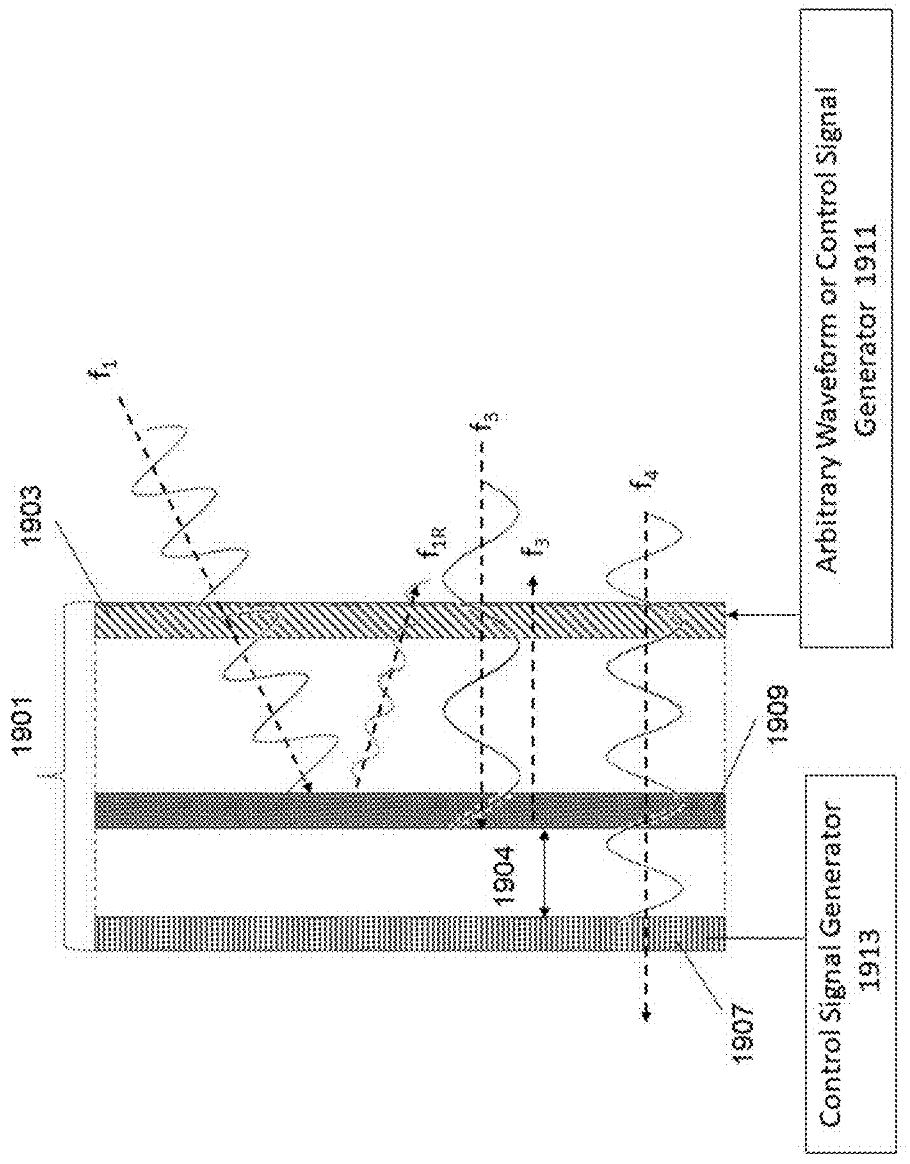
FIG. 19 is a diagram of the metamaterial system of FIG. 18 but with the absorber layers electronically switched to be reflective to $f_3$ but transparent to $f_4$ in accordance with an embodiment of the present invention.

FIG. 19 is a diagram of the metamaterial system of FIG. 18 but with the absorber layers electronically switched to be reflective to $f_3$ but transparent to $f_4$ in accordance with an embodiment of the present invention. This is possible by designing an electronically controlled band-pass metamaterial to control the passband using PIN, PN, FETs or varactor diodes as part of 1907 and actuating the metamaterial layer 1907 using a control signal generator 1913 or 1813 from FIG. 18.

Figure 20:
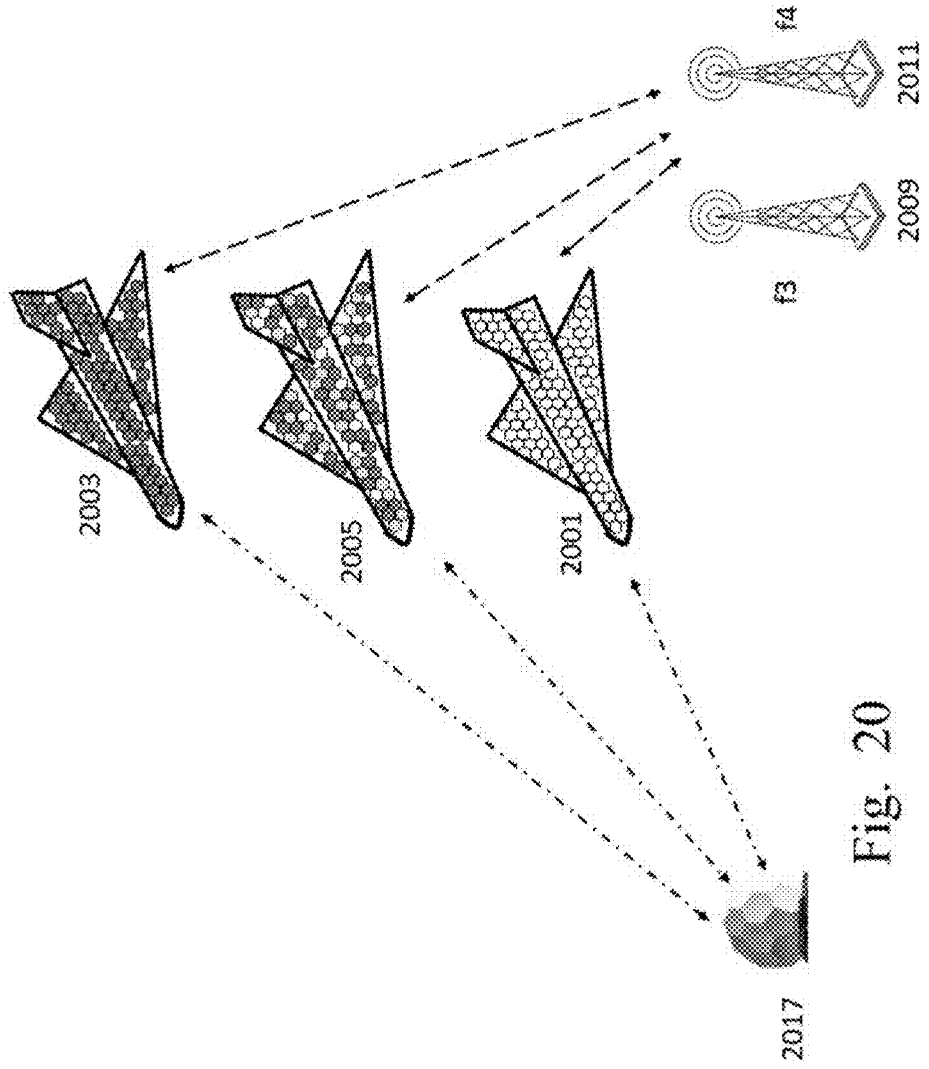
FIG. 20 is a diagram of three identical aircrafts that have incorporated the controllable metamaterial system of FIG. 18 and FIG. 19 and can controllably receive communications from communication towers at frequencies $f_3$ and $f_4$ in accordance with an embodiment of the present invention

In accordance with an embodiment of the present invention, FIG. 20 is a diagram of three identical aircrafts that have incorporated the controllable metamaterial system of FIG. 18 and FIG. 19 and can controllably receive communications from communication towers 2009 and 2011 at frequencies $f_3$ and $f_4$. The three aircrafts 2001, 2003, 2005, correspond to the aircrafts described in FIG. 13, FIG. 14, and FIG. 16. The aircrafts can switch between communication frequencies $f_3$ and $f_4$ as needed while maintaining the same response to radar frequency $f_1$, 2017, and having the same radar cross-section behavior to FIG. 13, FIG. 14, and FIG. 16.

Figure 21:
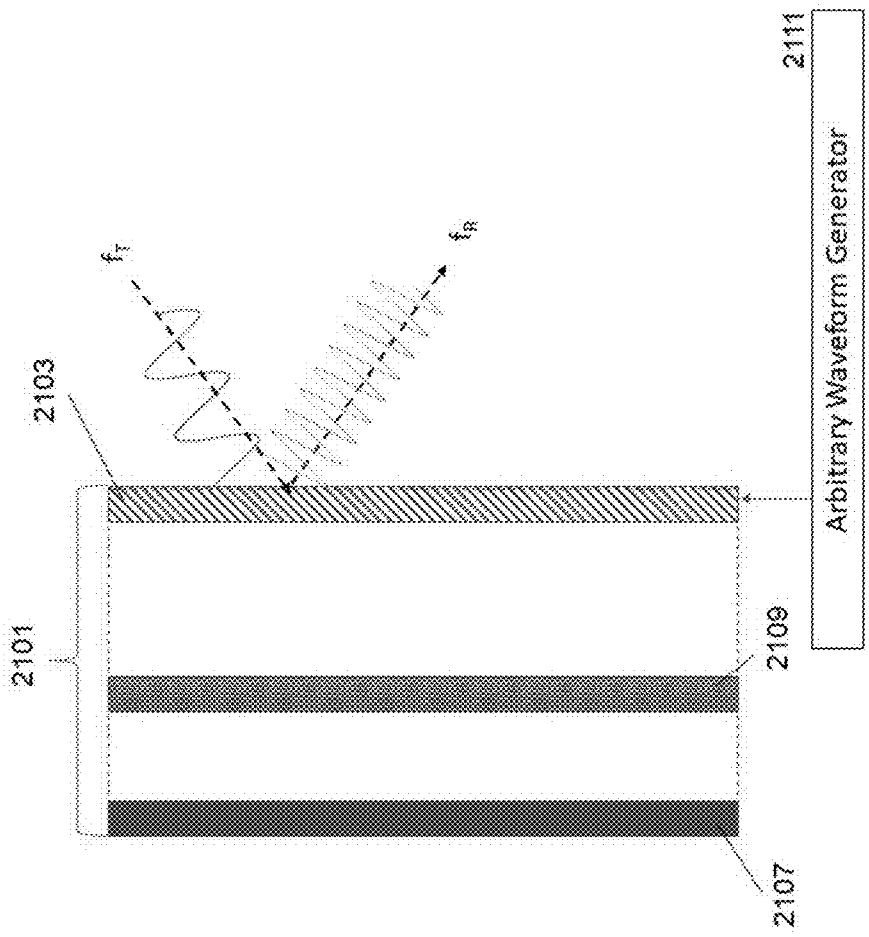
FIG. 21 is a diagram of a controllable metamaterial system identical to FIG. 11 with the ability to controllably change the frequency of the incident radar pulse $f_T$ to create a doppler shift on the reflected radar pulse $f_R$ in Accordance with an Embodiment of the Present invention.

FIG. 21 is a diagram of a controllable metamaterial system, in accordance with an embodiment of the present invention, identical to that of FIG. 11 with the ability to controllably change the frequency of the incident radar pulse $f_T$ to create a doppler shift on the reflect radar pulse $f_R$. The arbitrary waveform generator, 2111, can be used to modulate the band-pass or band-reject metamaterial to create a change in reflected phase and in turn, a doppler shift on an incident RF pulse $f_T$, that is reflected by the metamaterial 2103. This doppler shift results in a change in frequency of the reflected wave $f_R$ and can be detected by radar systems as a radial velocity. The absorber metamaterials of 2109 and 2107 do allow for the ability to also change the radar cross-section as described previously but they are not needed to create a doppler shift of a reflected wave as shown. A band-pass or band-reject metamaterial 2103 along with an arbitrary waveform generator can be used as a standalone device to controllably change the doppler shift of the incident wave. The operating principle is that the band-pass/band-reject filter is constructed with varactor/PIN diodes that can controllably change their capacitance with an applied voltage. This change in capacitance corresponds toa phase and frequency response that also varies with applied voltage. Varactor diodes have a varying capacitance with voltage, whereas a PIN diode has a fixed capacitance when off and is modeled as having no capacitance when on. By modulating the applied voltage in time, it is possible to change the phase of a reflected wave (phase of S11) which results in a change in doppler shift. Changing the frequency of the modulated voltage adjusts the phase change and the extent of the doppler shift and/or changing the modulation waveform also adjusts the linearity of this doppler shift. This same modulation technique can also be used to change the phase of a transmitted wave at the frequency that is transparent to a stand-alone band-pass/band-reject filter. This can be used to modify the path lengths through a material to create coherent RF beams if needed.

Figure 22:
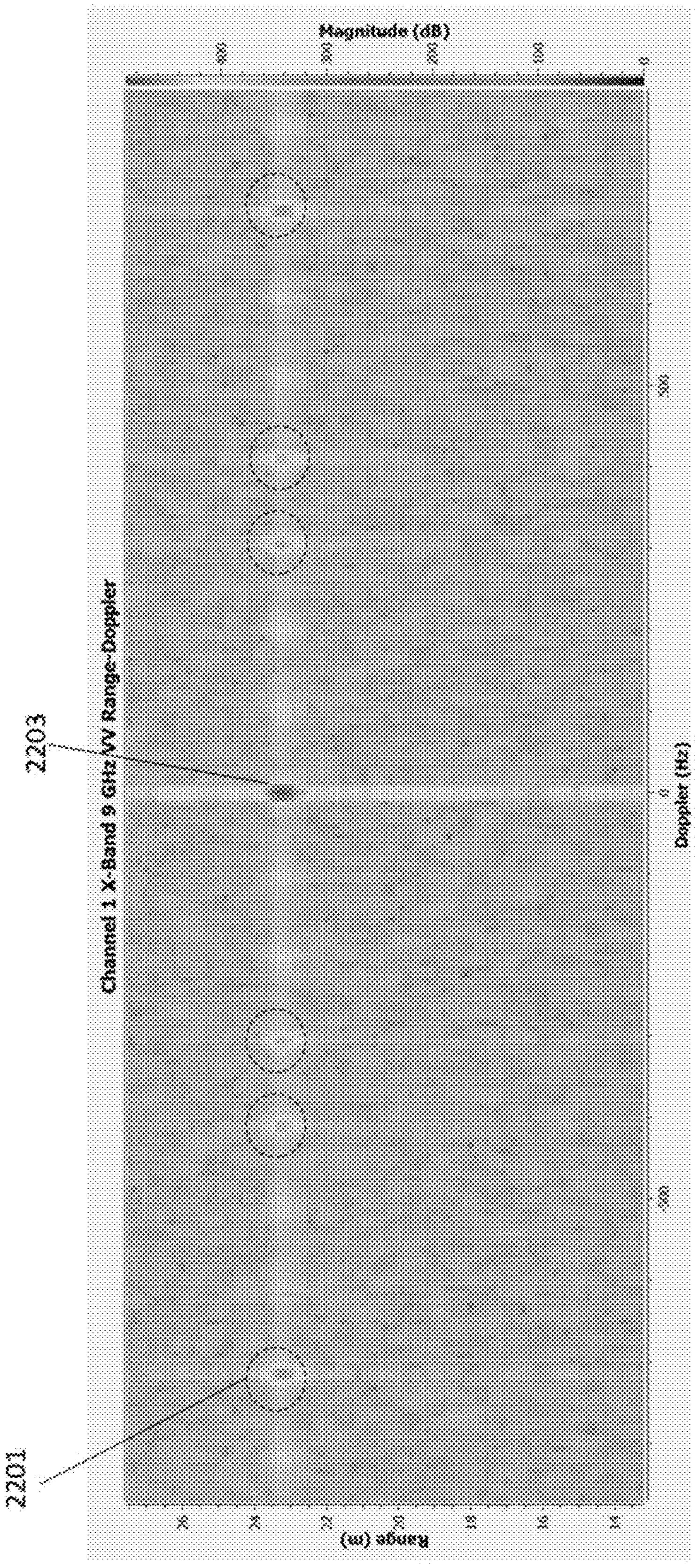
FIG. 22 is a measured doppler-range and magnitude plot at X-band illustrating multiple spoofed velocity targets of a stationary object made of the metamaterial from FIG. 21 in accordance with an embodiment of the present invention.
Figure 23:
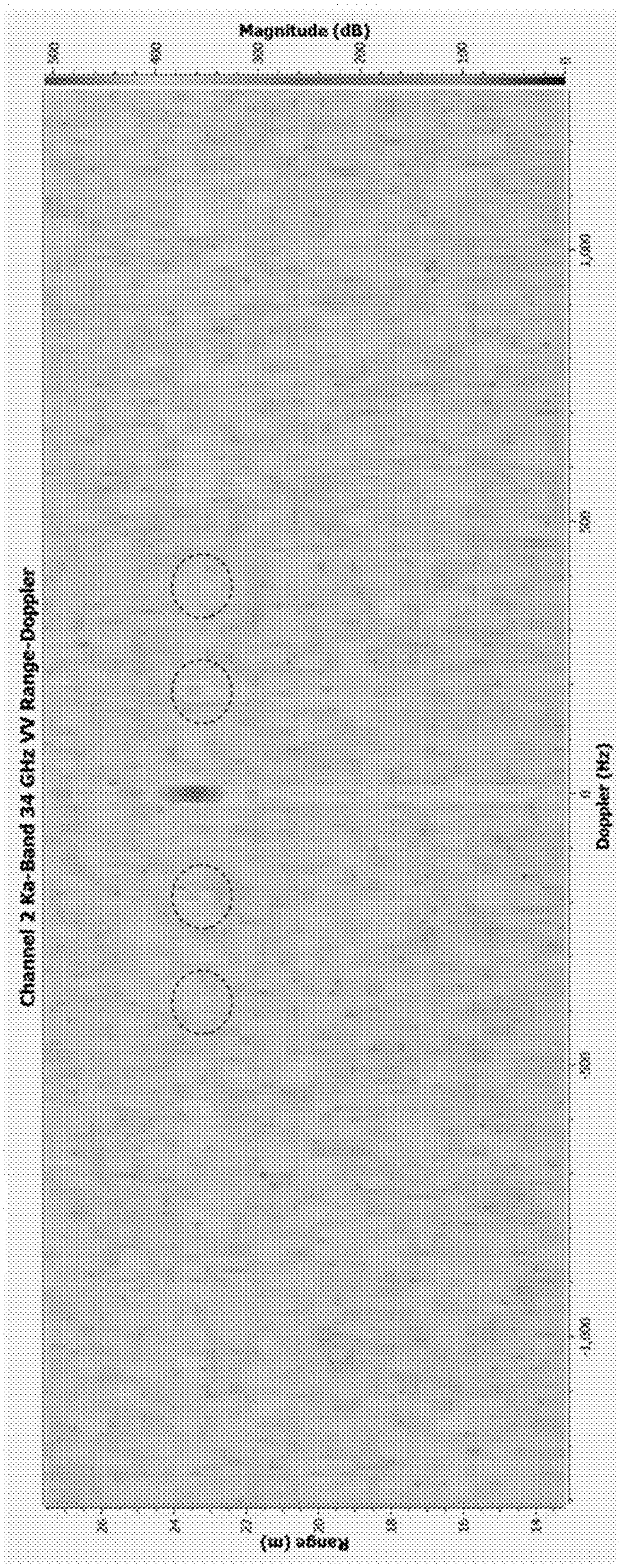
FIG. 23 is a measured doppler-range and magnitude at Ka-band of the same target from FIG. 22 in accordance with an embodiment of the present invention.

FIG. 22 is a measured doppler-range and magnitude plot at X-band illustrating multiple spoofed velocity targets of a stationary object made of the metamaterial from FIG. 21 in accordance with an embodiment of the present invention. The stationary object, 2203, is made from a controllable metamaterial system of FIG. 21. The radar system detects the object at 23 m from the radar source and the true target has no velocity 2203. By modulating the band-pass metamaterial with a modulated voltage waveform, multiple targets can be generated that have multiple doppler shifts that are circled, 2201, as shown. The doppler frequencies are symmetric with both positive and negative shifts corresponding to spoofed targets moving away and towards the radar. The waveform can be constructed to have multiple frequency components and to generate a linear or non-linear phase and consequently velocity response from the metamaterial. The multiple frequency components of the waveform can be used to create radial velocities common to different radar frequencies used to not be classified as clutter. FIG. 23 is a measured doppler-range and magnitude at Ka-band of the same target from FIG. 22. The waveform used for both FIG. 22 and FIG. 23 can have frequency components to create spoofed targets with identical velocities at the different radar frequencies. The repetitive waveform can be at a set of frequencies less than the pulse repetition frequency of the radar to only affect a change of the velocity of the object. The repetitive waveform can be at a set of frequencies greater than the pulse repetition frequency it can also affect the velocity as well as the range.

Figure 24:
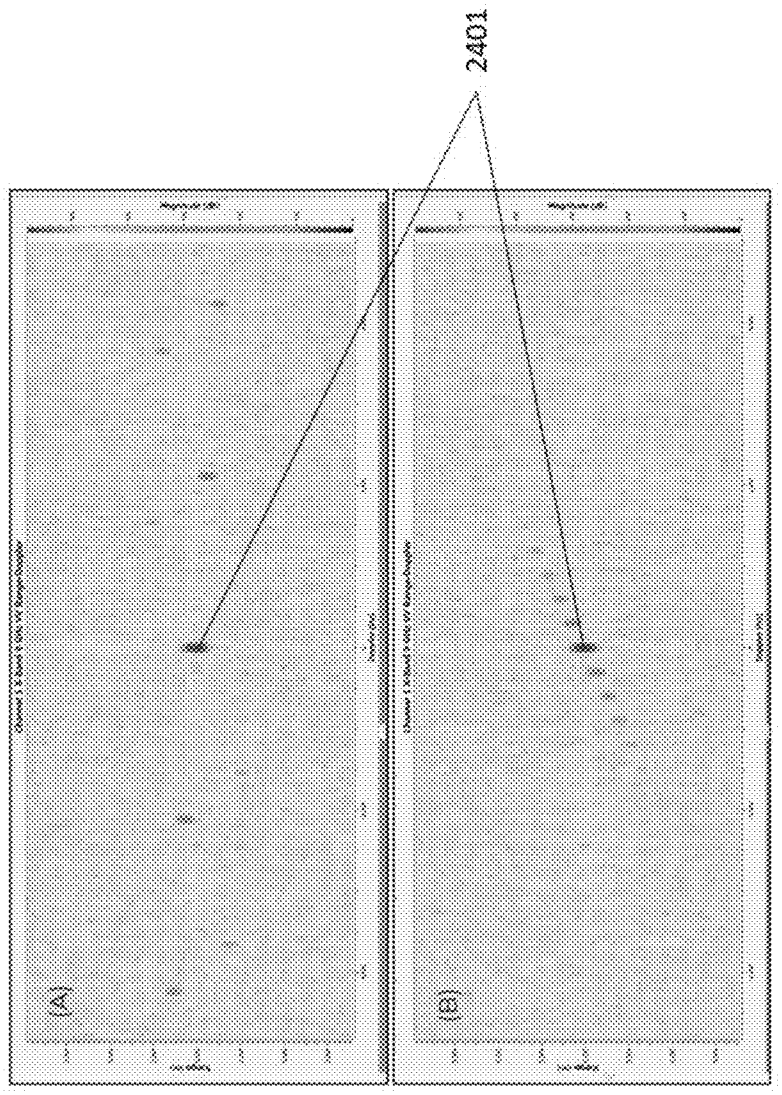
FIG. 24 is a measured doppler-range and magnitude plot at X-band illustrating spoofing of range and velocity information of a stationary object made of the metamaterial from FIG. 21 in accordance with an embodiment of the present invention.

FIG. 24 is a measured doppler-range and magnitude plot at X-band illustrating spoofing of range and velocity information of a stationary object made of the metamaterial from FIG. 21 in accordance with an embodiment of the present invention. A stationary object made from the controllable metamaterial is modulated with a repetitive waveform that can be at a high frequency, greater than the pulse repetition frequency of the radar and not an integer multiple of the pulse repetition frequency. This creates multiple fake targets that have different ranges and velocities. The true target sits at the center of both plots (A) and (B). The subplot (A) also shows a distribution of range and velocity of spoofed targets that look similar to a data encoded in constellation diagrams for digital modulation schemes such as PSK and QAM. Encoded messages through such digital modulation schemes and even encoded images can be constructed in the doppler-range plot for encoding messages, all by modulating the waveform of an arbitrary waveform generator that actuates a band-pass or band-reject metamaterial configured to be reflective to an incoming radar frequency $f_1$.

Figure 25:
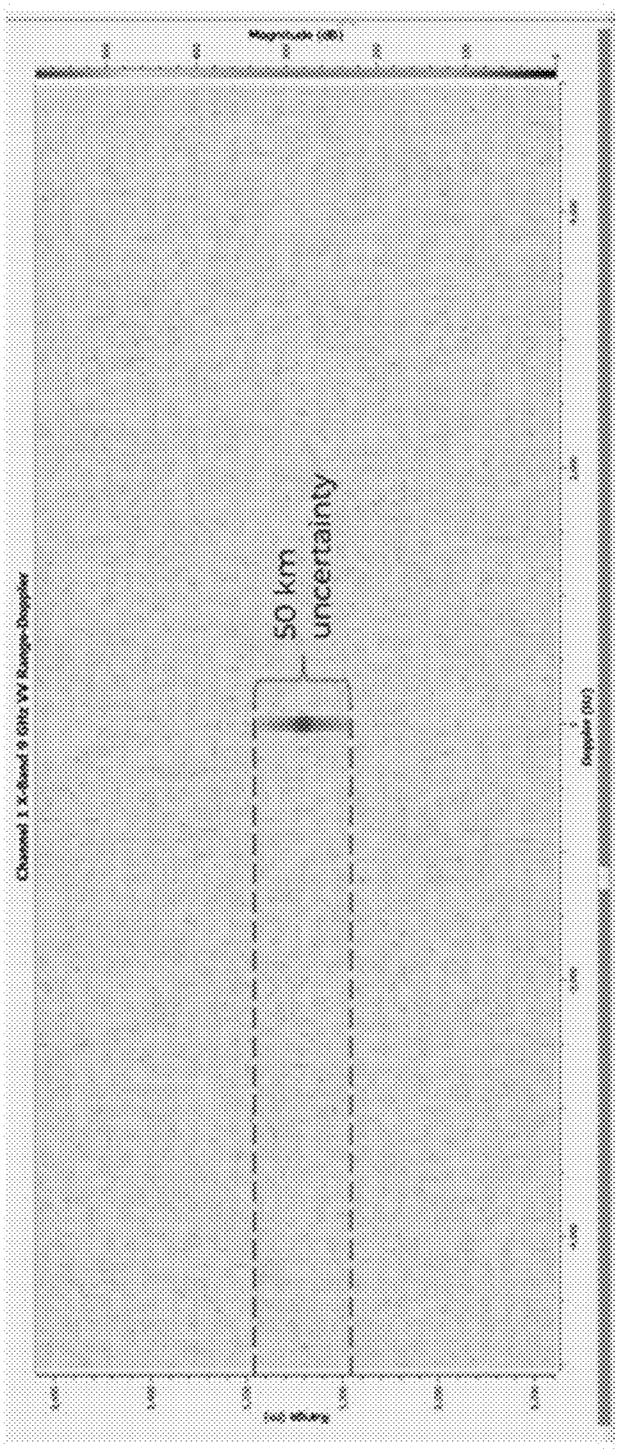
FIG. 25 is a measured doppler-range and magnitude plot at X-band illustrating spoofing of range information, creating 50 km of uncertainty, of a stationary object made of the metamaterial from FIG. 21 in accordance with an embodiment of the present invention.

FIG. 25 is a measured doppler-range and magnitude plot at X-band illustrating spoofing of range information, creating 50 km of uncertainty, of a stationary object made of the metamaterial from FIG. 21 in accordance with an embodiment of the present invention. A stationary object made from the controllable metamaterial system of FIG. 21 is modulated with a waveform at a set of frequencies that are an integer multiple of the pulse repetition frequency. The doppler shift associated with the change in phase of the reflected wave creates multiple targets that align perfectly along a specific range axis. A 50 km range of uncertainty was created in this case making it difficult to identify the exact range of the target of interest.

Figure 26:
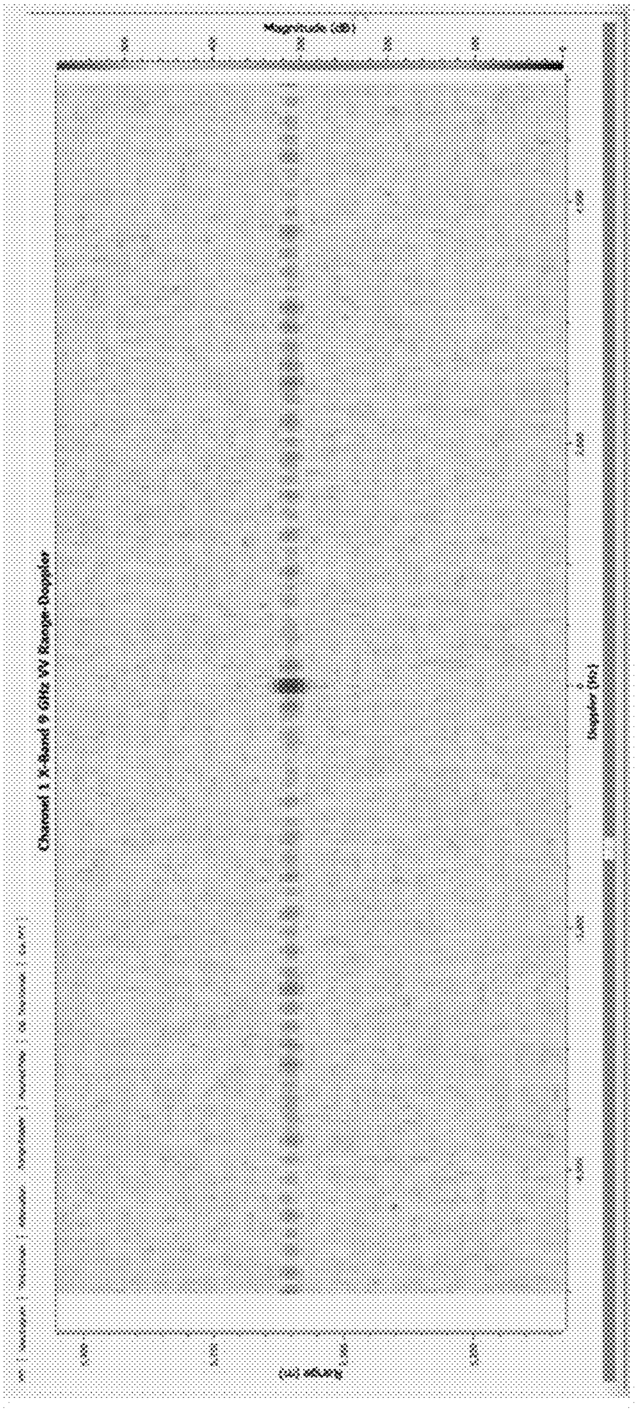
FIG. 26 is a measured doppler-range and magnitude plot at X-band illustrating a set of randomly moving multiple fake targets moving at various speeds from a stationary object made of the metamaterial from FIG. 21 in accordance with an embodiment of the present invention.

FIG. 26 is a measured doppler-range and magnitude plot at X-band illustrating a set of randomly moving multiple fake targets moving at various speeds from a stationary object made of the metamaterial from FIG. 21 in accordance with an embodiment of the present invention. A stationary object made from the controllable metamaterial system of FIG. 21 is modulated with a waveform that is a pseudorandom like a pseudorandom binary sequence waveform. The frequency of the pseudorandom binary sequence waveform can be set to modify the velocity only or increased to modify both the velocity and range of the spoofed targets.

Figure 27:
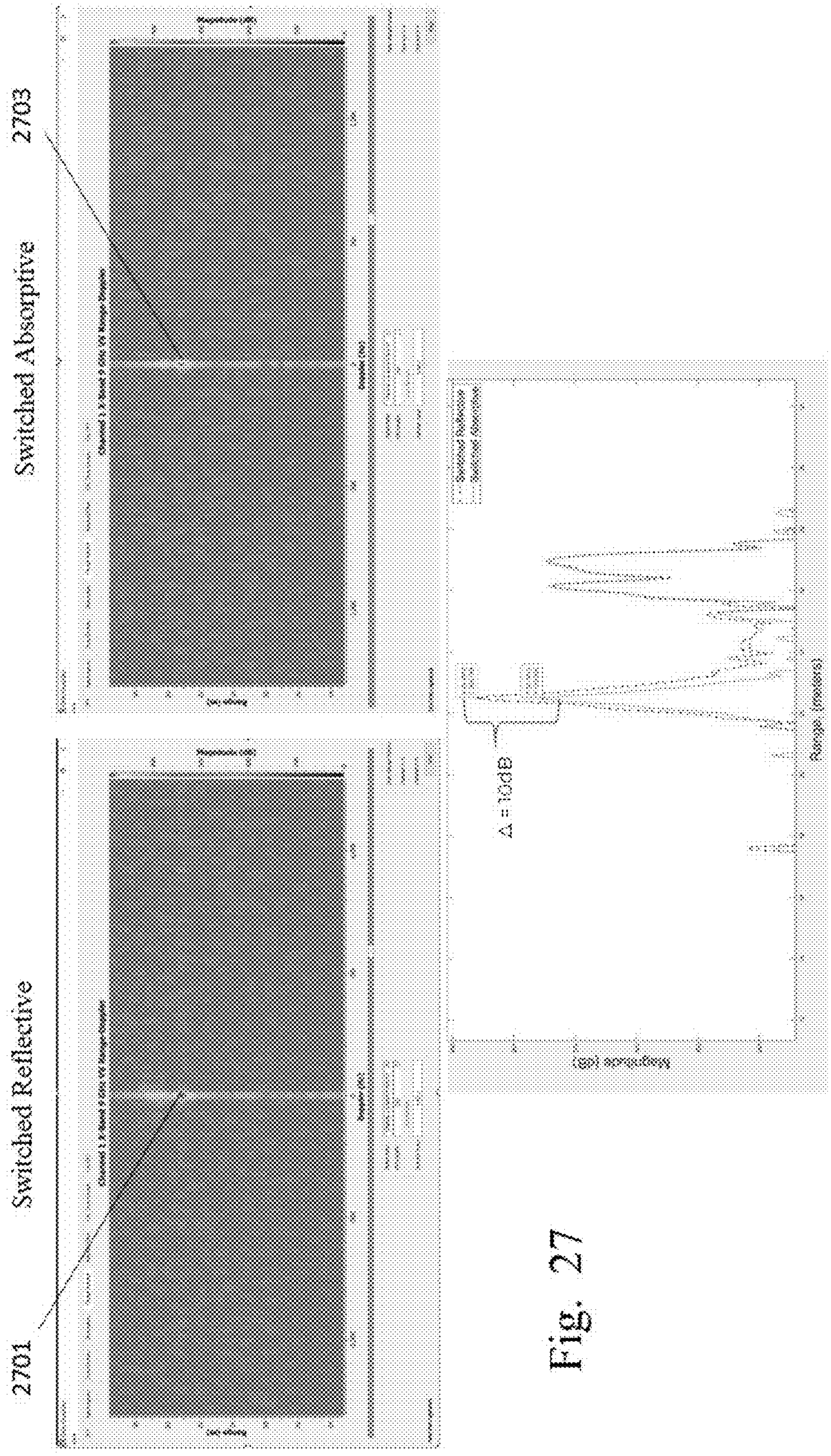
FIG. 27 is a set of measured doppler-range and magnitude plot at X-band of a target that has its radar cross-section controllably reduced and increased using a controlled metamaterial system from FIG. 21 in accordance with an embodiment of the present invention.

FIG. 27 is a set of measured doppler-range and magnitude plot at X-band of a target that has its radar cross-section controllably reduced and increased using a controlled metamaterial system from FIG. 21 in accordance with an embodiment of the present invention. The metamaterial system of FIG. 21 when configured to be reflective to X-band has a larger magnitude return, 2701, when the band-pass metamaterial is configured to be reflective. By configuring the band-pass metamaterial to be transparent the radar return is significantly reduced as shown in 2703 of the switched absorptive doppler-range magnitude plot. A 2D plot of radar return magnitude is plotted as a function of range at the doppler shift of 0 Hz (stationary) set of data and a 10 dB change in range can be controllably actuated using the controllable metamaterial system.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for making adjustable a radar profile of an object, the method comprising:

integrating into the object a set of metamaterial structures including a first metamaterial structure having an exterior surface defining an outer surface of the object and configured to be controllably reflective so as to operate, in a first mode wherein the outer surface is reflective at an external radar frequency f1 so as to cause reflection of an RF radar wave at frequency f1, incident on the object, and in a second mode wherein the outer surface is transmissive;

coupling a waveform generator to the set of metamaterial structures including the first metamaterial structure; and configuring the waveform generator to cause a corresponding temporal variation in reflectivity of the first metamaterial structure with a resulting phase change in the reflected RF radar wave and a change in doppler shift associated with the reflected RF radar wave and therefore modification of the radar profile of the object by operating in a mode selected from the group consisting of:

(a) generating a repetitive waveform at a set of frequencies for providing a change of the radar profile only in a range of the object;

(b) generating a repetitive waveform at a set of frequencies for providing a change of the radar profile in both range and velocity of the object;

(c) generating a repetitive waveform at a set of frequencies for providing a change of the radar profile only in a velocity of the object;

(d) generating a pseudorandom binary sequence waveform at a set of frequencies for providing a set of radar decoys having a set of different ranges and velocities as compared to those of the object; and (e) combinations of the foregoing;

wherein operation of the waveform generator causes the corresponding temporal variation in reflectivity of the first metamaterial structure having the exterior surface that defines the outer surface of the object so as to produce the phase change of the reflected RF radar wave and the change in doppler shift of the reflected RF radar wave and therefore an adjustment of the radar profile of the object.

2. A method according to claim 1, wherein the mode is selected from the group consisting of:

(a) generating a repetitive waveform at a set of frequencies for providing a change of the radar profile in both range and velocity of the object;

(b) generating a repetitive waveform at a set of frequencies for providing a change of the radar profile only in a velocity of the object;

(c) generating a pseudorandom binary sequence waveform at a set of frequencies for providing a set of radar decoys having a set of different ranges and velocities as compared to those of the object; and (d) combinations of the foregoing.

3. A method according to claim 1, wherein the mode is selected from the group consisting of:

(a) generating a repetitive waveform at a set of frequencies for providing a change of the radar profile only in a range of the object;

(b) generating a repetitive waveform at a set of frequencies for providing a change of the radar profile only in a velocity of the object;

(c) generating a pseudorandom binary sequence waveform at a set of frequencies for providing a set of radar decoys having a set of different ranges and velocities as compared to those of the object; and (d) combinations of the foregoing.

4. A method according to claim 1, wherein the mode is selected from the group consisting of:

(a) generating a repetitive waveform at a set of frequencies for providing a change of the radar profile only in a range of the object;

(b) generating a repetitive waveform at a set of frequencies for providing a change of the radar profile in both range and velocity of the object;

(c) generating a pseudorandom binary sequence waveform at a set of frequencies for providing a set of radar decoys having a set of different ranges and velocities as compared to those of the object; and (d) combinations of the foregoing.

5. A method according to claim 1, wherein the waveform generator is configured to operate in a set of modes selected from the group consisting of:

(a) generating a repetitive waveform at a set of frequencies for providing a change of the radar profile only in a range of the object;

(b) generating a repetitive waveform at a set of frequencies for providing a change of the radar profile in both range and velocity of the object;

(c) generating a repetitive waveform at a set of frequencies for providing a change of the radar profile only in a velocity of the object; and (d) combinations of the foregoing.

6. A method according to claim 1, further comprising configuring the waveform generator further to modulate the reflection of the RF radar wave as a means of encoding information in digital communications.

7. A method according to claim 1, further comprising configuring the waveform generator to operate in a mode selected from the group consisting of:

(a) generating a repetitive waveform at a set of frequencies for providing a change of the radar profile only in a velocity of the object;

(b) generating a pseudorandom binary sequence waveform at a set of frequencies for providing a set of radar decoys having a set of different ranges and velocities as compared to those of the object; and (c) combinations of the foregoing.

8. A method according to claim 1, further comprising configuring the waveform generator to operate in a mode selected from the group consisting of:

(a) generating a repetitive waveform at a set of frequencies for providing a change of the radar profile only in a range of the object;

(b) generating a pseudorandom binary sequence waveform at a set of frequencies for providing a set of radar decoys having a set of different ranges and velocities as compared to those of the object; and (c) combinations of the foregoing.

9. A method according to claim 1, further comprising configuring the waveform generator to operate in a mode selected from the group consisting of:

(a) generating a repetitive waveform at a set of frequencies for providing a change of the radar profile only in a range of the object;

(b) generating a repetitive waveform at a set of frequencies for providing a change of the radar profile in both range and velocity of the object; and (c) combinations of the foregoing.

10. A method according to claim 1, further comprising configuring the waveform generator to operate in a mode selected from the group consisting of:

(a) generating a repetitive waveform at a set of frequencies for providing a change of the radar profile only in a range of the object;

(b) generating a repetitive waveform at a set of frequencies for providing a change of the radar profile only in a velocity of the object; and (c) combinations of the foregoing.

11. A method for making adjustable a radar profile of an object, the method comprising:

integrating into the object a set of metamaterial structures including (i) a first metamaterial structure having an exterior surface defining an outer surface of the object and configured, with respect to a radar wave at frequency f1 incident on the object, to be controllably reflective; and (ii) a second metamaterial structure having an exterior surface configured, with respect to the radar wave at frequency f1 incident on the object, to be absorptive;

wherein integrating includes overlaying the first metamaterial structure on the second metamaterial structure; and coupling a control signal generator, to apply an adjustable signal to the set of metamaterial structures including the first metamaterial structure, so as to apply thereto an adjustable signal, and configuring the control signal generator to cause the exterior surface of the first metamaterial structure to operate in a transparent mode and to control an extent of transmissivity thereof, at the radar frequency f1, in combination with absorption by exterior surface of the second metamaterial structure, so as to endow the object with a customized radar cross-section that is potentially larger, or smaller, than that of the object without the metamaterial system, or to render the object invisible to radar;

wherein operation of the control signal generator to apply the adjustable signal produces an adjustment in the extent of transmissivity of the first metamaterial structure and a corresponding adjustment in absorption by the second metamaterial structure and therefore a corresponding adjustment of the radar profile of the object.

12. A method according to claim 11, wherein integrating includes supporting communications through both the first and the second metamaterial structures, while still functioning as a radar reflector at frequency f1, by the exterior surfaces of the first and second metamaterial structures being configured to be transmissive at a frequency different from f1.

13. A method according to claim 12, wherein supporting communications further includes allowing for multiple communication channels by the exterior surfaces of the first and second metamaterial structures being electronically configured to be transmissive at a plurality of non-radar frequencies.

14. A method according to claim 12, wherein integrating into the object includes incorporating the set of metamaterial structures into a vehicle.

15. A method according to claim 13, wherein allowing for multiple communication channels further includes providing flexibility in communication and radar operation by any given one of the plurality of transmissive frequencies being user selectable.

16. A method according to claim 13, wherein allowing for multiple communication channels further includes allowing for precise adjustment of the communication and radar operation by any given one of the plurality of transmissive frequencies being tunable.

17. A method according to claim 13, wherein integrating into the object includes incorporating the set of metamaterial structures into a vehicle.

18. A method according to claim 15, wherein integrating into the object includes incorporating the set of metamaterial structures into a vehicle.

19. A method according to claim 16, wherein integrating into the object includes incorporating the set of metamaterial structures into a vehicle.

20. A method according to claim 11, wherein integrating into the object includes incorporating the set of metamaterial structures into a vehicle.

* * * * *